United States Patent [19]
Miyoshi et al.

[11] Patent Number: 5,197,121
[45] Date of Patent: Mar. 23, 1993

[54] DATA PROCESSING SYSTEM AND EDITING DEVICE AIDED THEREBY

[75] Inventors: Akito Miyoshi; Hiromitsu Terai, both of Saitama, Japan

[73] Assignee: Honda Giken Kogyo Kabushiki Kaisha, Tokyo, Japan

[21] Appl. No.: 360,913

[22] PCT Filed: Aug. 17, 1988

[86] PCT No.: PCT/JP88/00810
§ 371 Date: Mar. 27, 1989
§ 102(e) Date: Mar. 27, 1989

[87] PCT Pub. No.: WO89/02116
PCT Pub. Date: Sep. 3, 1989

[30] Foreign Application Priority Data

Aug. 28, 1987 [JP] Japan .................. 62-216231
Oct. 15, 1987 [JP] Japan .................. 62-258292

[51] Int. Cl.⁵ .................................. G06F 15/20
[52] U.S. Cl. .................... 345/146; 395/144
[58] Field of Search ............ 364/518, 521, 523; 355/14 R; 395/144, 145, 146, 148, 149

[56] References Cited

U.S. PATENT DOCUMENTS 4,905,185  2/1990  Sakai .................... 395/146
5,107,419  4/1992  MacPhail ............ 395/148 X

FOREIGN PATENT DOCUMENTS 1091354   12/1980  Canada .
1199413    1/1986  Canada .
49-65751   6/1974  Japan .
59-214966 12/1984  Japan .

Primary Examiner—Heather R. Herndon

[57] ABSTRACT

An editing apparatus inputs element data such as document or sentences by use of keyboards, sets a key corresponding to the data in a work station thereof, and is equipped with components for setting a special letter identification code which designates a specific character that cannot be input by conventional personal computers and/or word processors, and constructs a special character in response to that code, thereby making it possible to use personal computers and/or word processors for the entry of substantially all data needed by the editing apparatus.

8 Claims, 34 Drawing Sheets

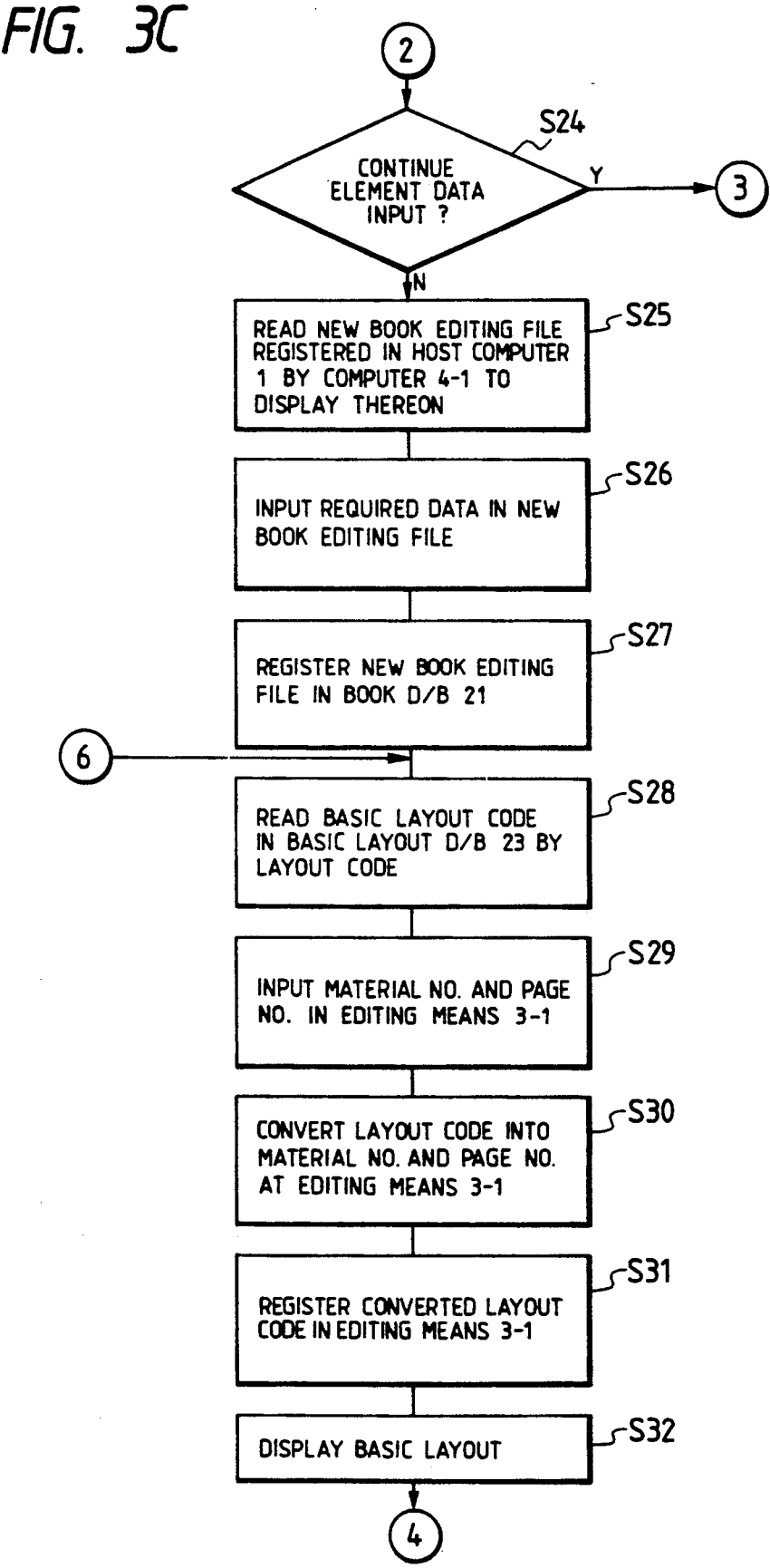

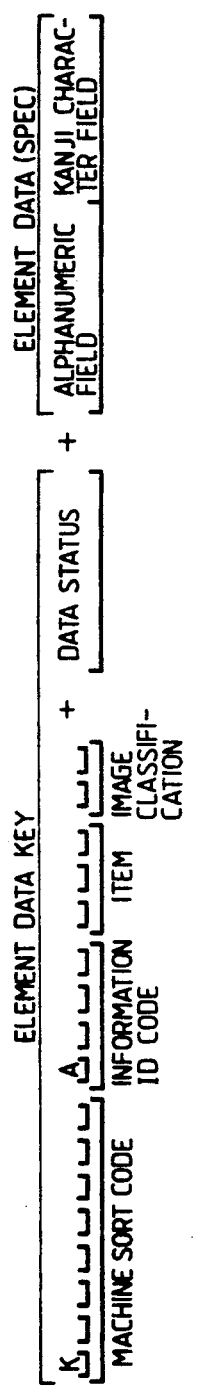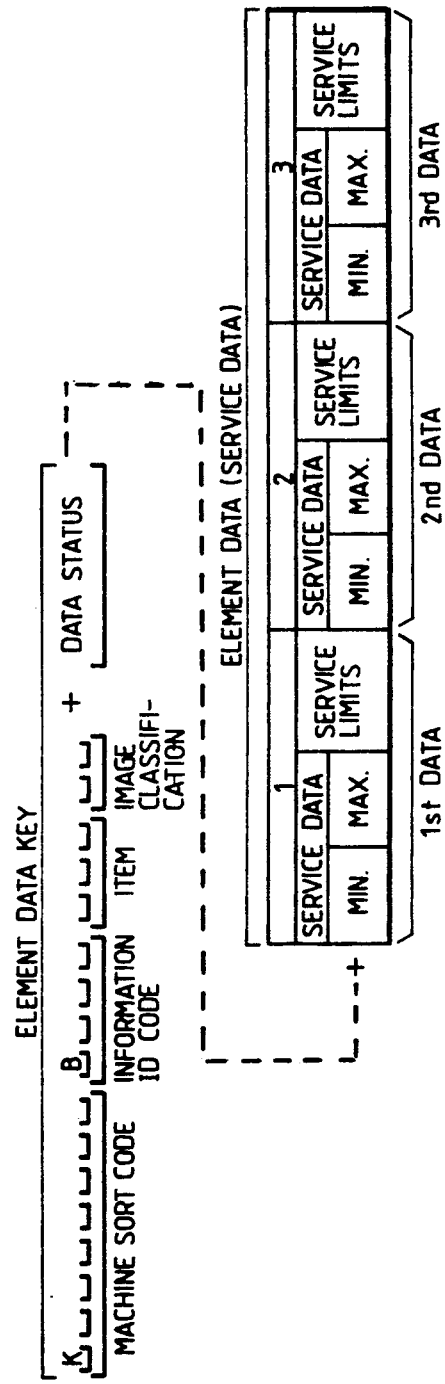

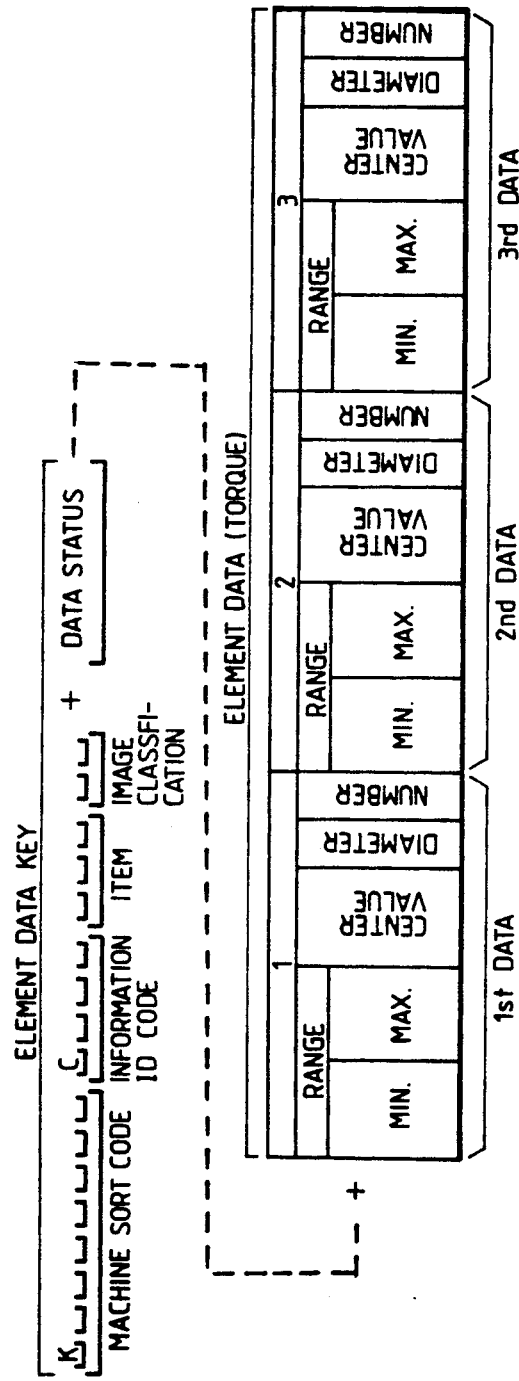
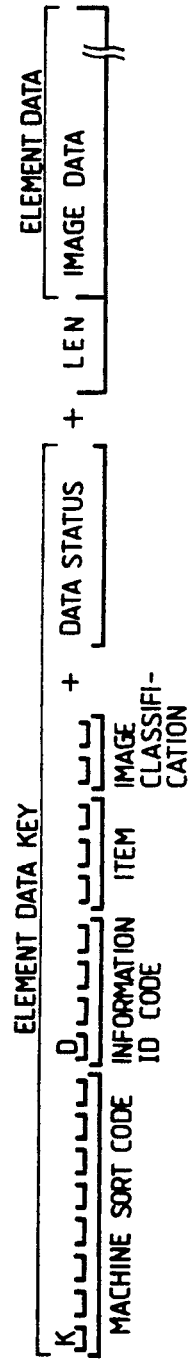
FIG. 8
FIG. 9

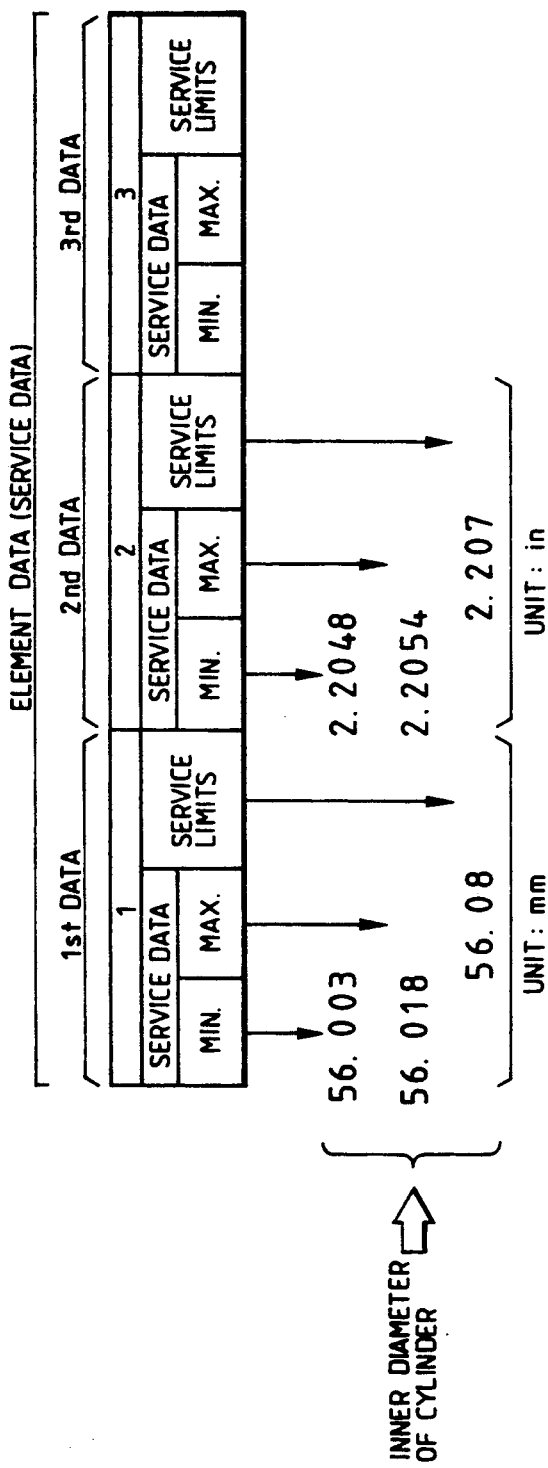

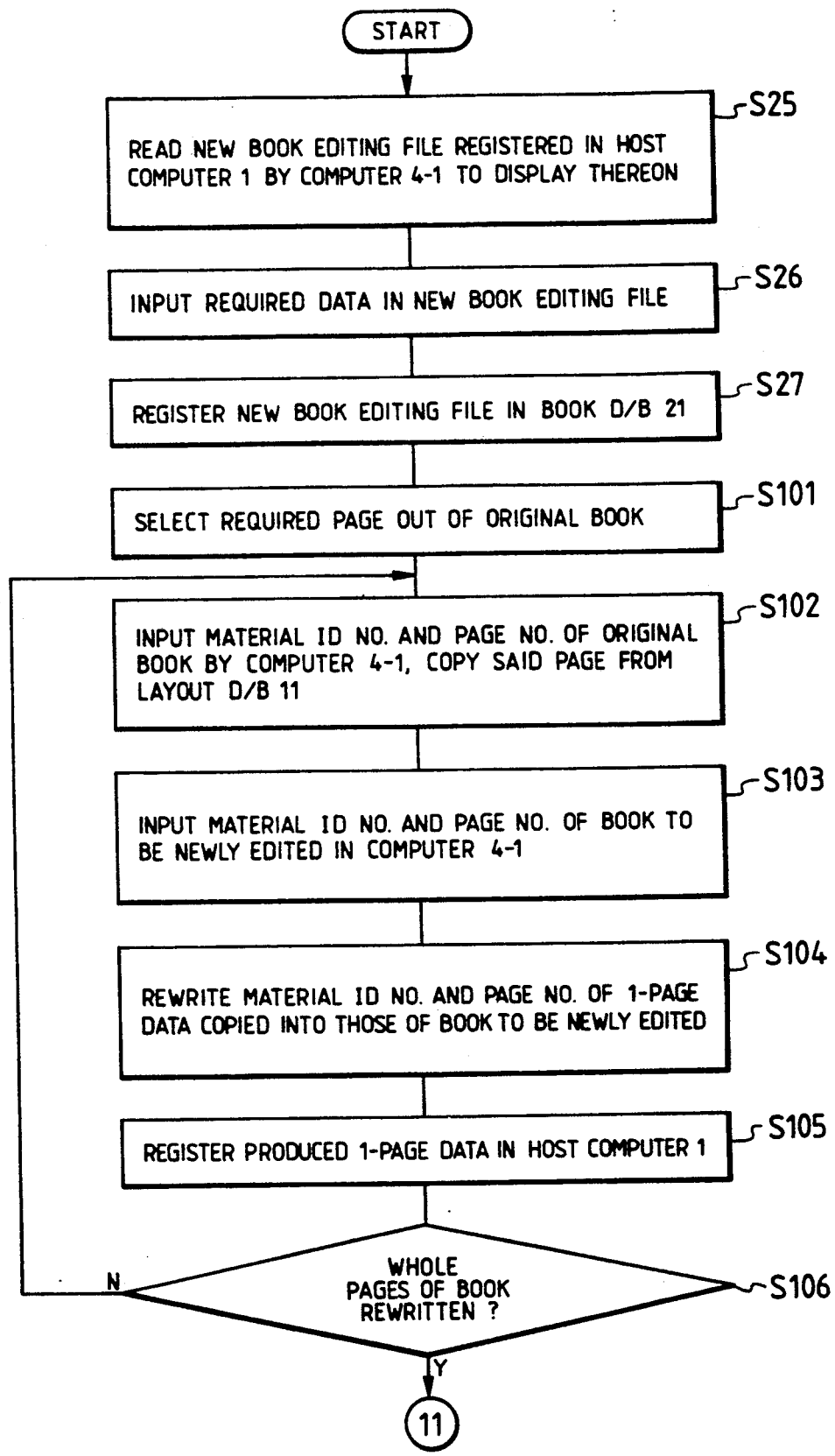

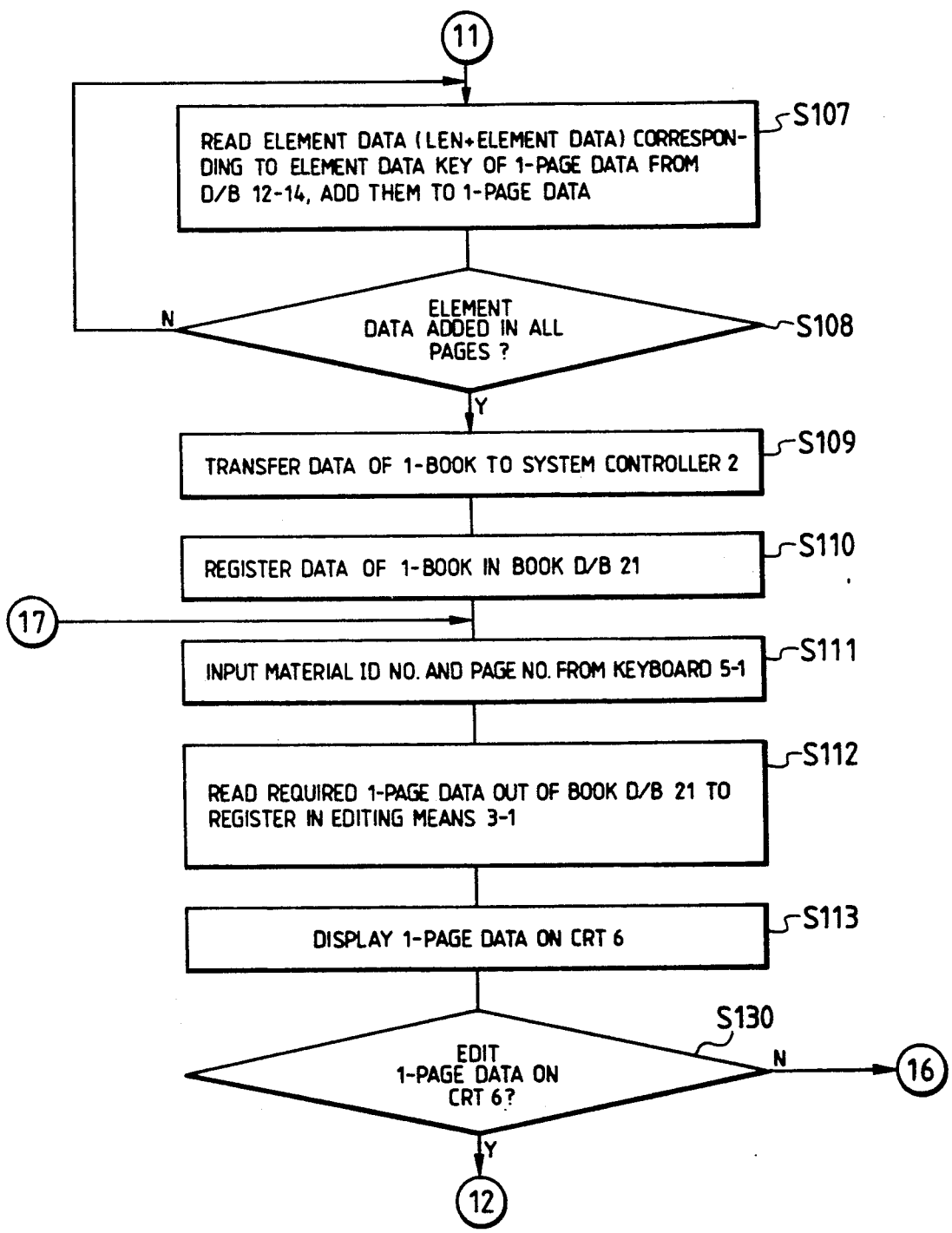

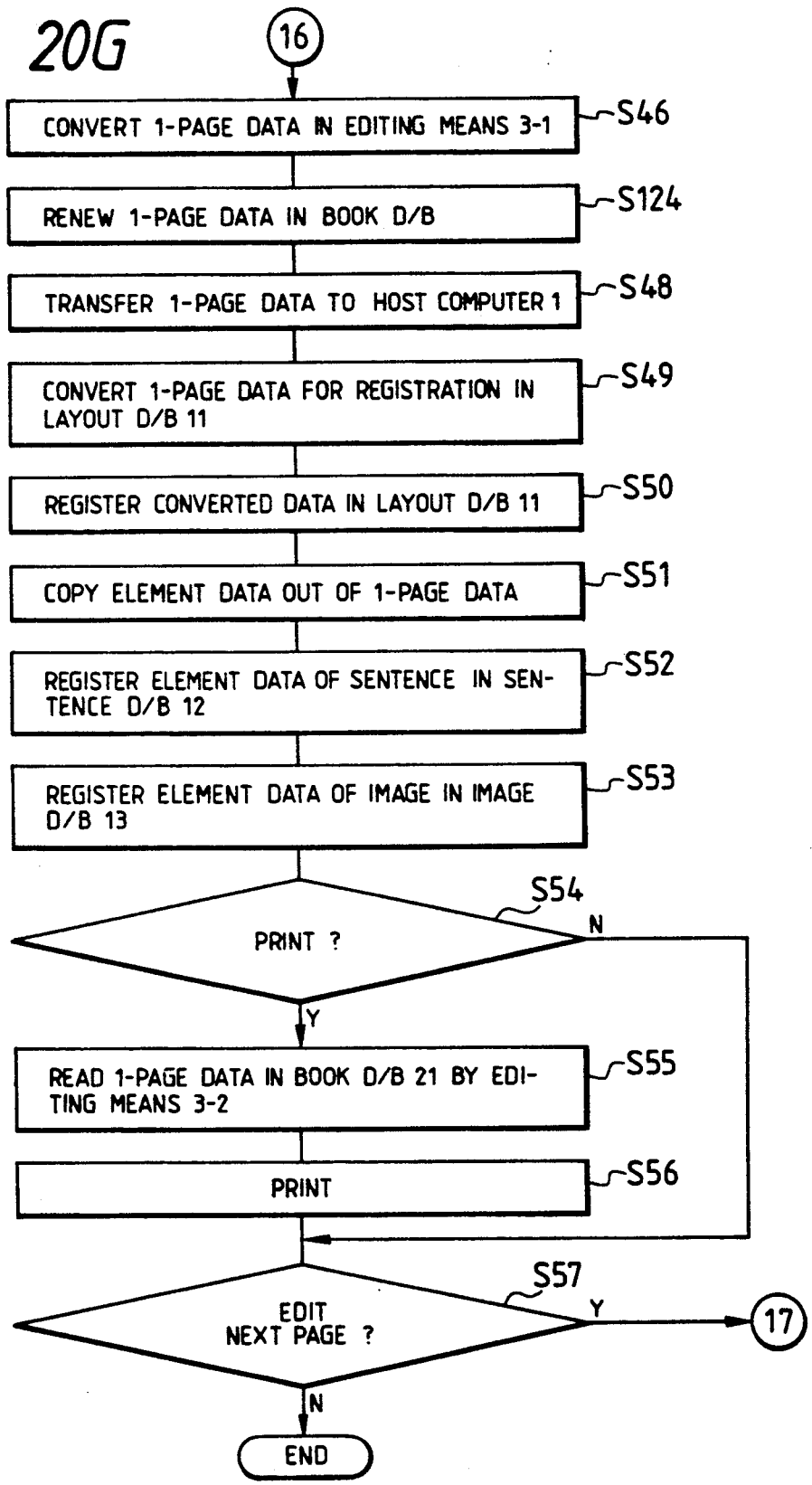

FIG. 25

| CONVERSION CLASS | IMAGE CLASS | DISPLAY ON CRT |
|---|---|---|
| 10 | 10 | 56. 003-56. 018mm |
|  | 20 | 56. 003-56. 018mm (2. 2048-2. 2054in) |
|  | ⋮ | ⋮ |
| 20 | 10 | 2. 2048-2. 2054in |
|  | 20 | 2. 2048-2. 2054in (56. 003-56. 018mm) |
|  | ⋮ | ⋮ |
| 40 | 10 | 56. 003-56. 018mm |
|  | 20 | 56. 003-56. 018mm (2. 2048-2. 2054in) |
|  | ⋮ | ⋮ |
| ⋮ | ⋮ | ⋮ |

DATA PROCESSING SYSTEM AND EDITING DEVICE AIDED THEREBY

TECHNICAL FIELD

The present invention relates to an editing apparatus aided by a data processing system. More particularly, the present invention is directed to an editing apparatus capable of easily editing an operating manual for an automobile or an electric appliance and the like or an ordinary book, magazine, newspaper etc. (simply referred to as a "book" hereinafter) within a short time.

BACKGROUND ART

In recent years, to edit books, editing apparatuses have been utilized which comprise a host computer including a data base (hereinafter referred to as a D/B), and small-scale computers (editorial purpose computers) connected to the host computer. The small-scale computers perform data input/output operations, whereas the host computer performs predetermined data processing by employing both the input data and the data registered in the D/B. These data are supervised in a page unit and data to be registered in the D/B among the data representing one page of the book are registered into the D/B.

In an editing apparatus having an arrangement as described above, the small-scale computers perform various functions, but complex operations are required to operate the editing apparatus which accordingly requires a long operating time. As a result, even when simple data is to be input into the editing apparatus, a single small-scale computer may have to be occupied for a long time period. In addition, since the cost of a small-scale computer is high, it becomes very expensive to install a large number of smallscale computers.

The present invention is intended to solve the above-described problems.

DISCLOSURE OF THE INVENTION

To solve the above-described problems, a particular feature of the invention is that a key having a common format is added to element data such as a document, or sentences, pictures, and illustrations, and the data of one page is edited by employing the element data, the key, and data relating to layout. Input means capable of inputting the element data by means of keyboards, and setting means for setting the key corresponding to the data, are provided in a work station which includes personal computers and/or word processors.

According to the present invention, data input operations for a document or the like are made easier, and thus the editing operation can be more simply effected. Particular advantages arise from the use of a large number of input means that can be provided at a relatively low cost.

Furthermore, according to the invention, additional advantages arise from the use of a work station that includes specific character identification code setting means for setting an identification code by which a specific character is designated, discriminating means for judging the specific character identification code, and specific character converting means for converting predetermined element data, which is input subsequent to the specific character identification code, into the specific character. As a result, a specific character which usually cannot be input by personal computers, word processors or the like, can be input by such personal computers and/or word processors. There is a particular advantage in using personal computers and word processors as element data input devices in editing apparatuses according to the present invention.

BRIEF DESCRIPTION OF THE DRAWINGS

FIG. 3A-3E, considered together, are a flowchart of a first editing method according to the first preferred embodiment of the invention.

FIG. 6 illustrates the format of a "spec" information element;

FIG. 7 illustrates the format of one element of service data information;

FIG. 8 indicates the format of one element of torque data information;

FIG. 9 illustrates the format of one element of image data information;

FIG. 10 illustrates the element data portion of the service data information shown in FIG. 7;

FIG. 11 represents a file for editing a new book;

FIG. 20A-20G, considered together, are a flowchart representing a second editing method according to the first preferred embodiment of the invention;

FIG. 25 is a graphic representation showing relationships of a conversion section, an image section and service data on a CRT;

DESCRIPTION OF THE PREFERRED EMBODIMENTS

Figure 1:
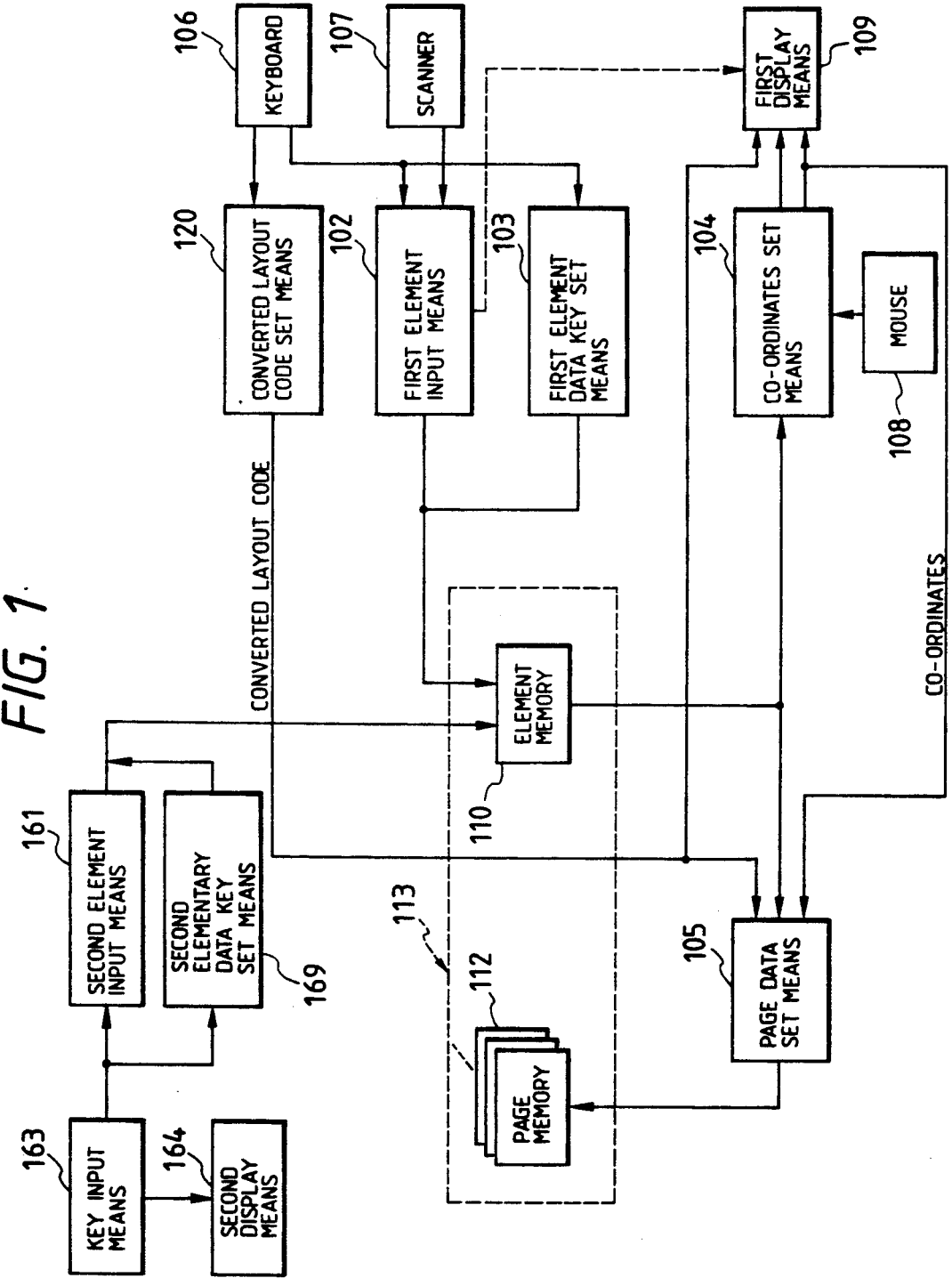
FIG. 1 is a functional block diagram illustrating a basic arrangement of the first preferred embodiment of this invention.

Referring now to the drawings, the present invention will be described in detail.

Figure 2:
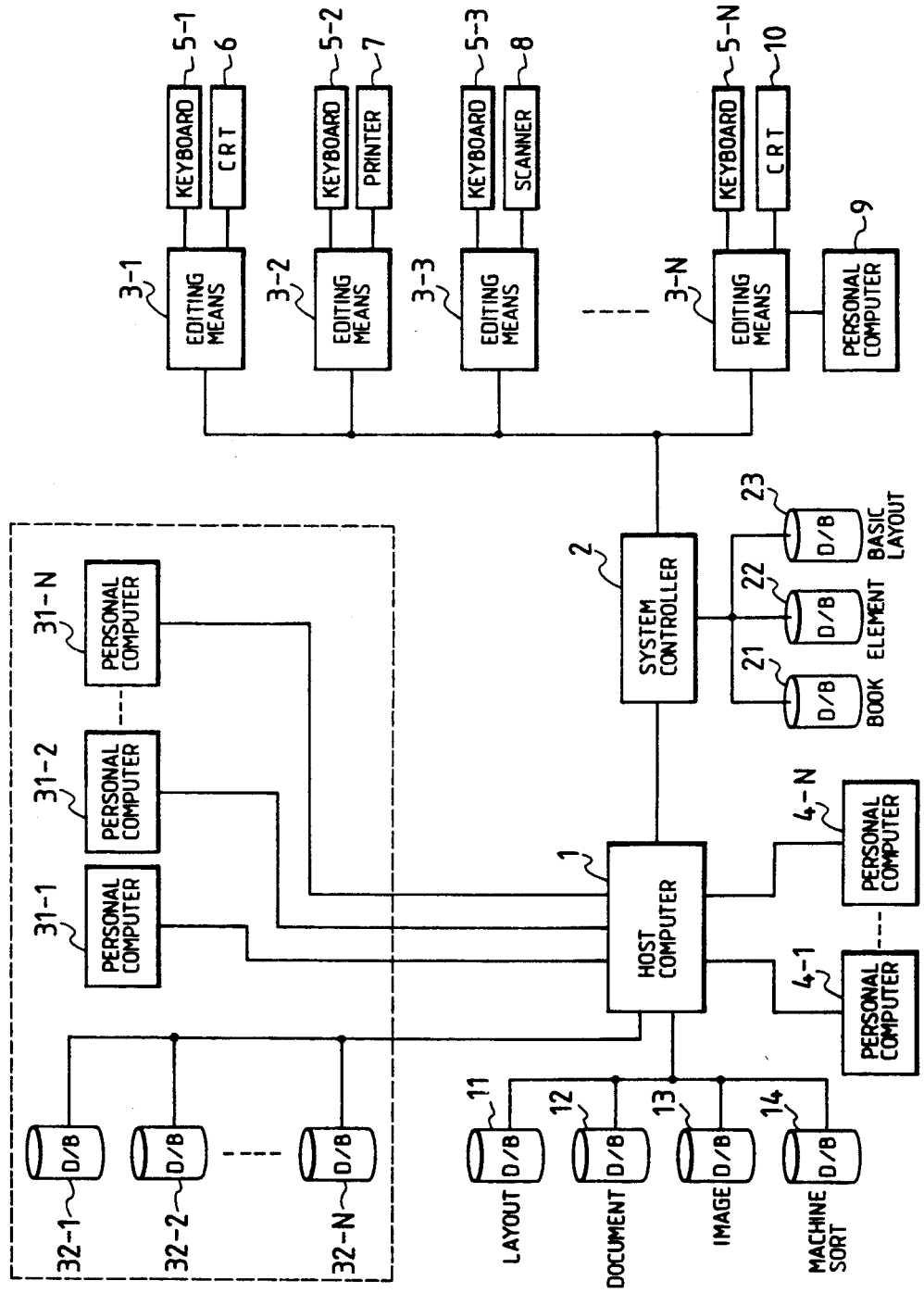
FIG. 2 is a schematic block diagram of the first preferred embodiment of the invention.
Figure 3A:
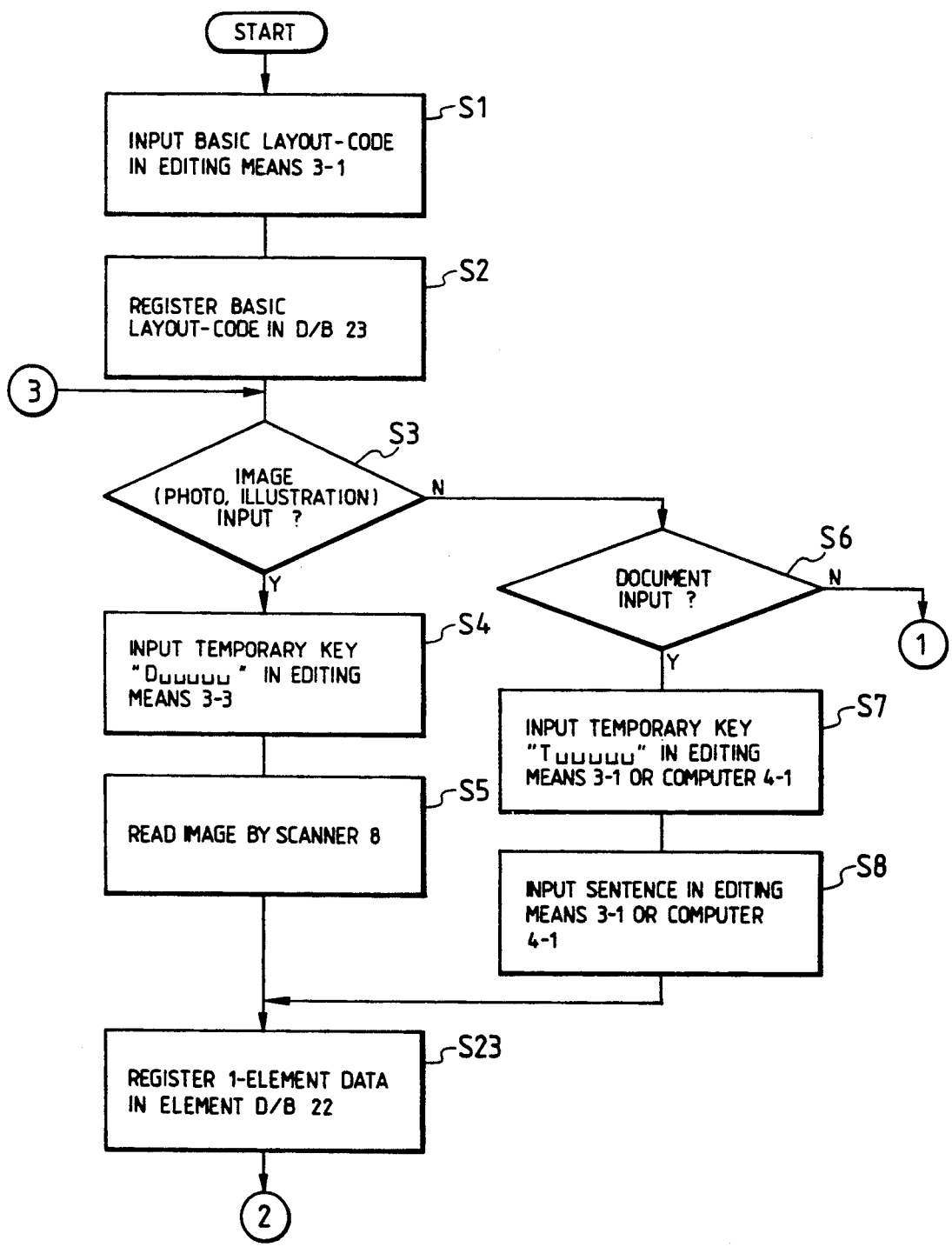
Figure 3B:
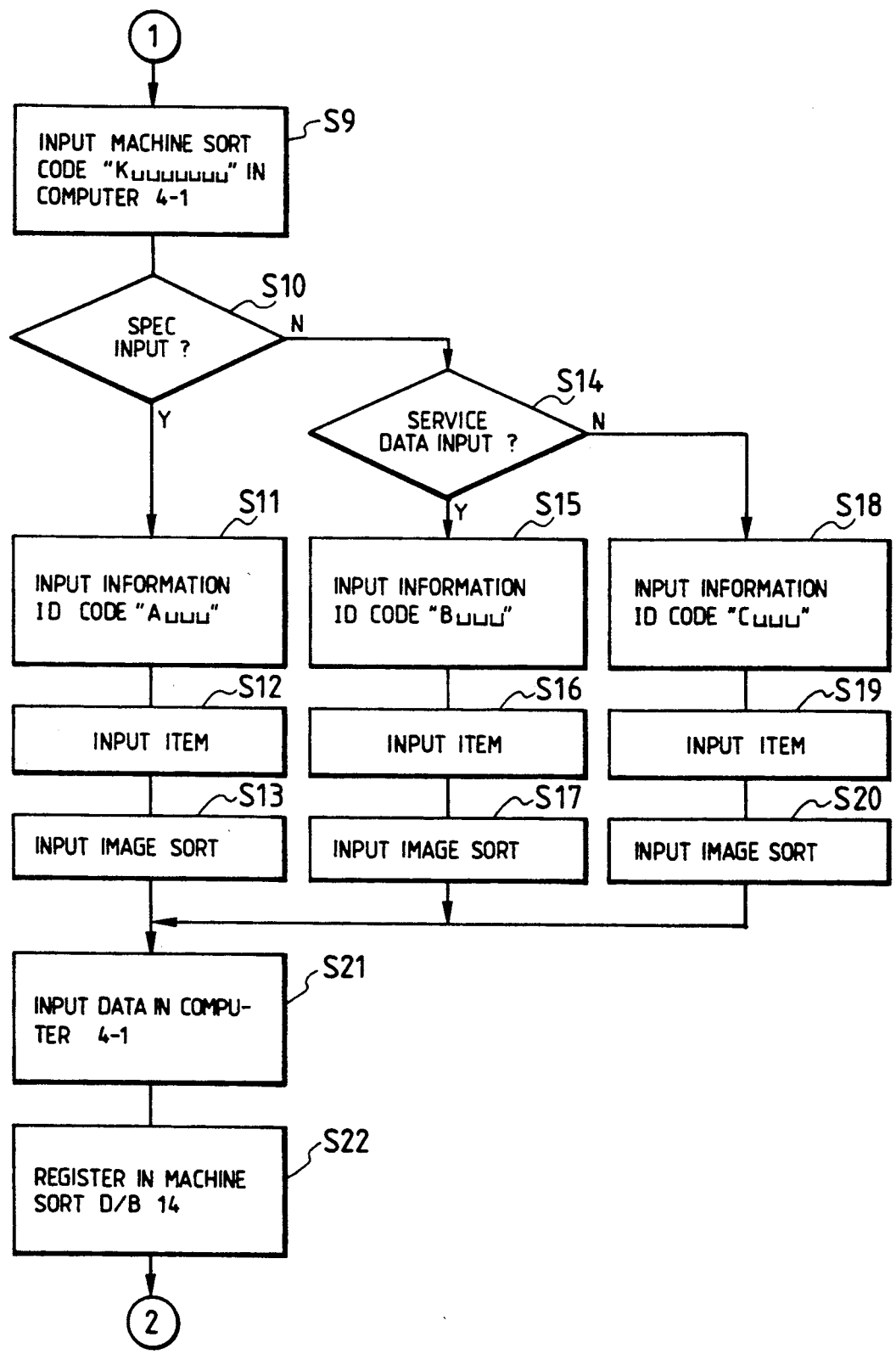
Figure 3D:
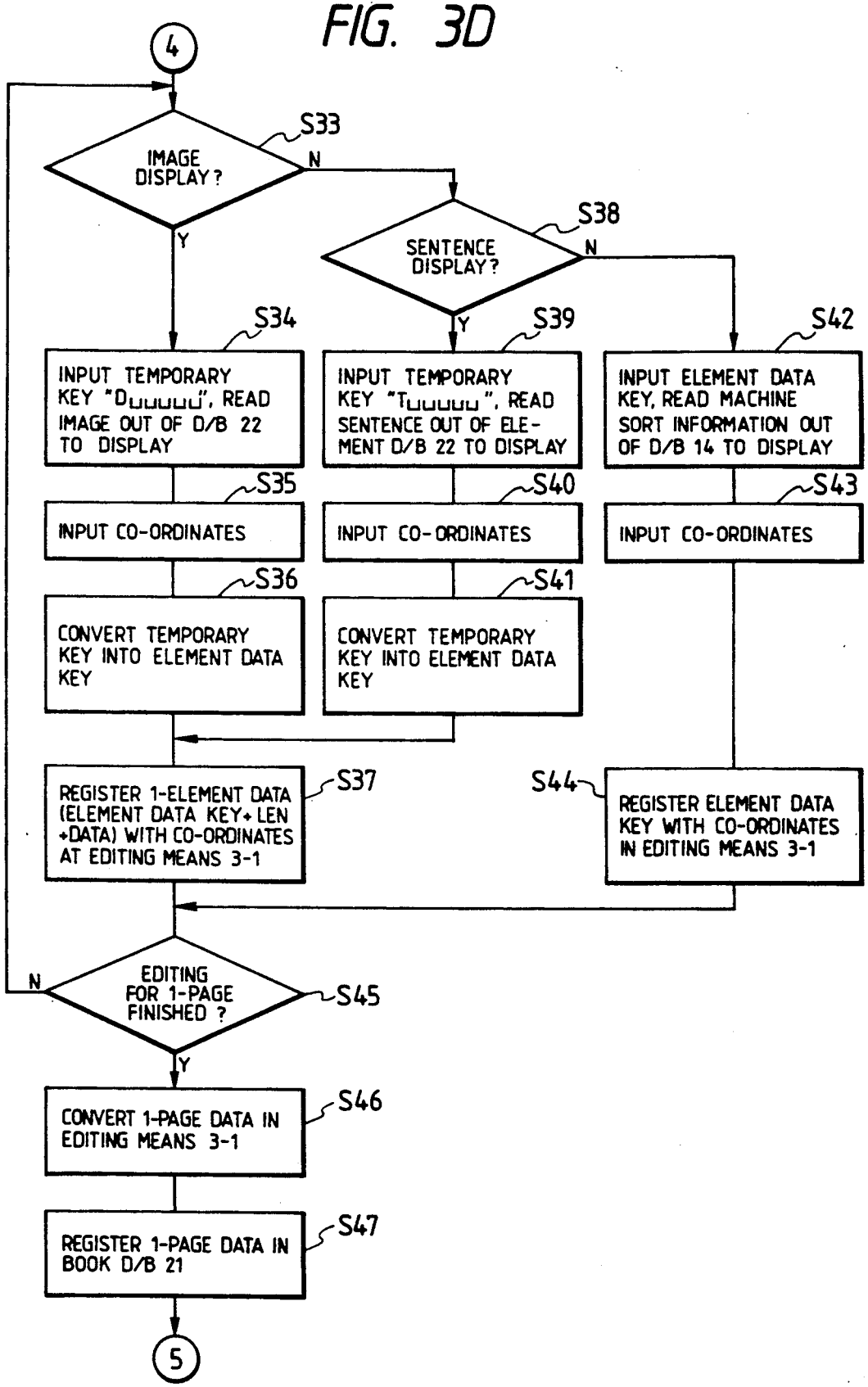
Figure 3E:
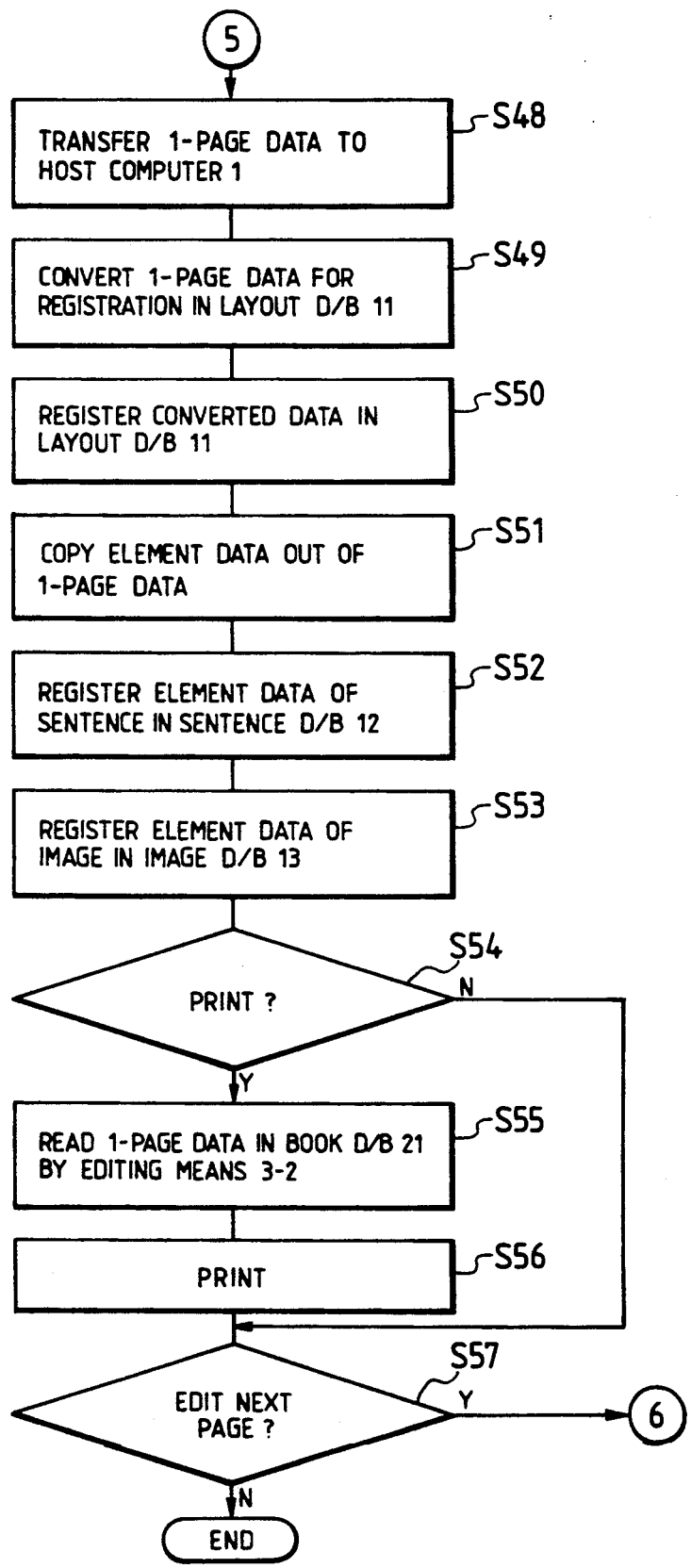

FIG. 2 is a schematic block diagram of a data processing apparatus according to one preferred embodiment of the invention.

In the figure, a plurality of work stations 3-1 to 3-N (termed "editing means" in the drawing) for inputting-/outputting data relating to documents, photographs, illustrations and the like are connected in an on-line mode to a system controller 2 used to control the editing apparatus. Since these devices are connected in the on-line mode to each other, the quantity of transferred data cannot be large, but the transfer speed of the data becomes high. These work stations receive information such as document data, photographs and illustrations by way of vector conversion.

A CRT (cathode-ray tube) 6 is connected to the editing means 3-1, a printer 7 is connected to the editing means 3-2, a scanner 8 is connected to the editing means 3-3, and a personal computer 9 and another CRT 10 are connected to the editing means 3-N. Furthermore keyboards 5-1 to 5-N are connected to the respective editing means 3-1 to 3-N.

The system controller 2 (a medium-scale relay computer) is connected to a host computer 1. A book data base (D/B) 21, an element data base 22 and a layout basic data base 23 are connected to the system controller 2. The system controller 2 controls the editing means 3-1 to 3-N, and transfers/receives information in a page unit or an element (document, photograph, the illustration) unit constituting one page to and from the respective editing means.

The host computer 1 is a large-scale general purpose computer such as an IBM 3090 or equivalent. The system controller 2, personal computers 4-1 to 4-N, layout D/B 11, document D/B 12, image D/B 13 and machine sort information D/B 14 are respectively connected to the host computer 1.

It should be noted that the personal computers 4-1 to 4-N may be exclusively used for editing, or for a general purpose other than editing, which is similar to personal computers 31-1 to 31-N (which will be discussed later).

If the editing means 3-1 to 3-N are capable of inputting a language (referred to as "a specific language") other than the language input by the personal computers 4-1 to 4-N, software for inputting and processing said specific language by the personal computers 4-1 to 4-N is provided, for instance, in the system controller 2. A mode to input the specific language is selected by the keyboards (not shown) of the personal computers 4-1 to 4-N. For example, when the "A" and ":" keys are depressed, the software stored in the system controller 2 displays the character "A". This software may, instead, be stored in either the host computer 1 or personal computers 4-1 to 4-N.

In addition, further software is provided in the system controller 2, for use by the personal computers 4-1 to 4-N to vector-convert document input. This is similar to the document input by the respective editing means 3-1 to 3-N.

The personal computers 31-1 to 31-N are employed to carry out jobs other than the editing work effected by the editing device of FIG. 2. The machines or parts surrounded by dotted line in FIG. 2 do not constitute part of the editing device of this invention.

The host computer 1 obtains the data used for one book from the information stored in the data bases 11 to 14, and transfers this data to the system controller 2. The system controller 2 transfers the information of one page which has been edited in the editing means 3-1 to 3-N to the host computer 1. Data transfers between the system controller 2 and the host computer 1 are performed in a so-called "batch" transmission. When the data code system processed in the host computer 1 is different from the data code system processed in the editing means 3-1 to 3-N, code conversion of these data is performed in either the host computer 1 or the system controller 2.

An operation of the data processing apparatus according to a preferred embodiment of the invention will now be described.

Basically, the editing means illustrated in FIG. 2 can produce or edit a new book by either of two editing methods, as follows.

(A) When a new book is newly produced in its entirety, all of the documents or sentences, illustrations, and photographs etc., to be written on each page of the new book must be newly input. This will be referred as "a first editing method".

(B) When a new book is produced by utilizing other books which have previously been edited or produced in the editing apparatus, necessary portions of the previous books are utilized for the new book and only minimum portions required to produce the new book are newly input. This will be referred to as "a second editing method".

FIGS. 3A to 19 relate to the production of a service manual (simply referred to as "a book" hereinafter) for a bike (autobicycle) in accordance with the above-defined first editing method.

FIGS. 3A-3E are a flowchart of the first editing method according to the preferred embodiment of the invention. In a first step S1 (FIG. 3A), a basic layout code is input into the editing apparatus to which CRT 6 is connected (for instance, the editing means 3-1) by the keyboard 5-1. The basic layout code is used to set the size of a book to be newly produced, the number of characters, the number of columns and the column space in one page of the new book.

Figure 4:
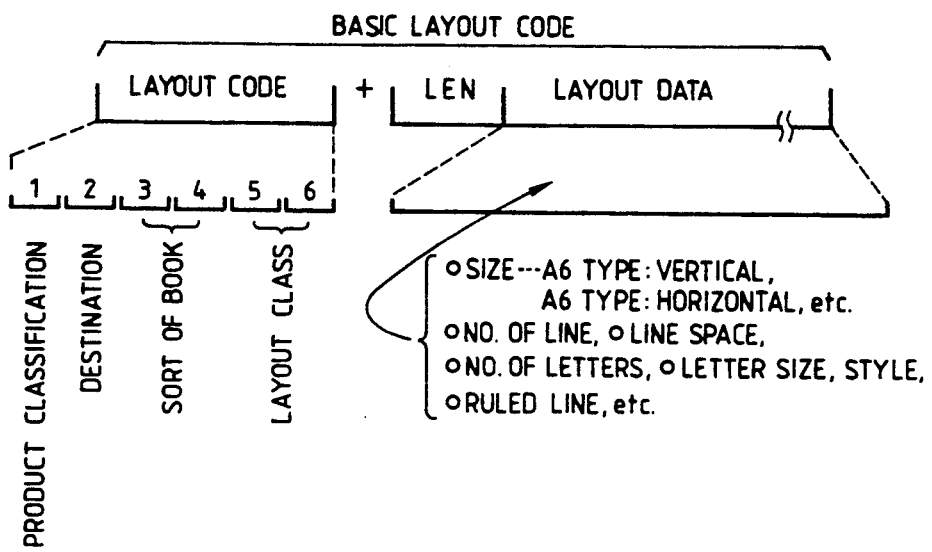
FIG. 4 illustrates the basic layout code.

FIG. 4 illustrates one example of the format of a basic layout code. The basic layout code includes a "layout code" portion having, for example, a 6-byte code length, a "layout data" portion, and another data portion(referred to hereinafter as a "LEN") representing the data length of the layout data.

The layout code portion provides data representing the product classification of the book to be produced, data indicating the location (country) for which the new book is destined, data representative of the sort of the new book, e.g., a service manual or shop manual and data representative of the layout of each page of the new book, e.g., a single frame or a double frame.

The layout data portion of the basic layout code includes data representing the size of each page of the book, i.e., A6 vertical, A6 horizontal and so on, and data indicative of the number of lines, the space between lines, the number of characters, the letter size or style, presence of a ruled line, etc. This layout data thus defines the concrete layout of a page that is to be displayed on a screen of CRT 6. The layout code portion is used merely as an identification code of the layout data, and said layout code portion is converted into a document identification number and a page number as will be described later in connection with the steps S29 and S30 of FIG. 3C.

When entry of the layout data is accomplished, a LEN of the layout data is added in front of the layout data. As previously described, the basic layout code is produced from the layout code, the LEN of layout data, and layout data.

Referring again to FIG. 3A, when the basic layout code is input, the editing means 3-1 transfers the basic layout code to the system controller 2 which registers the basic layout code in the basic layout D/B 23 (step S2). After the basic layout code has been so registered, steps S3 to S24 (FIGS. 3A–3C) effect entry of information relating to illustrations, photographs, document and the like which are to be arranged on each page of the book. Both illustrations and photographs are referred to as an "image" in the following description.

In step S3, a judgement is made whether or not the information to be input corresponds to an image. When an image is entered, a temporary key having, for instance, a 6-byte length is entered into the editing means 3-3 by the keyboard 5-3 (step S4). The temporary key corresponds to an identification code of image data to be entered and is determined by the operator. "D", indicating that this temporary key relates to image data, is entered into the head byte of the temporary key.

In the next step S5, the image is read out by the scanner 8.

In step S23, the temporary key, LEN of the readout image data, and the image data are registered into the element D/B 22 as one element data.

If a judgement is made in step S3 that no image is entered, another judgement is made in a step S6 whether or not a document or a sentence is entered. When a document (sentence) is entered, a temporary key is input into the editing apparatus 3-1 by the keyboard 5-1 or into any of the personal computers 4-1 to 4-N (step S7). As previously explained in reference to step S4, the temporary key has, for instance, a 6-byte length, and corresponds to an identification code of the document to be input which is determined by the operator himself. In this case, "T", indicating that the temporary key relates to a document, is input into the head byte of the temporary key.

In the subsequent step S8, the document or sentence is entered in the keyboard 5-1 or any one of personal computers 4-1 to 4-N. Then, in step S23, the temporary key entered in the previous step S7, LEN of the document entered in step S8, and this document are registered as one element data in the element D/B 22.

Figure 5:
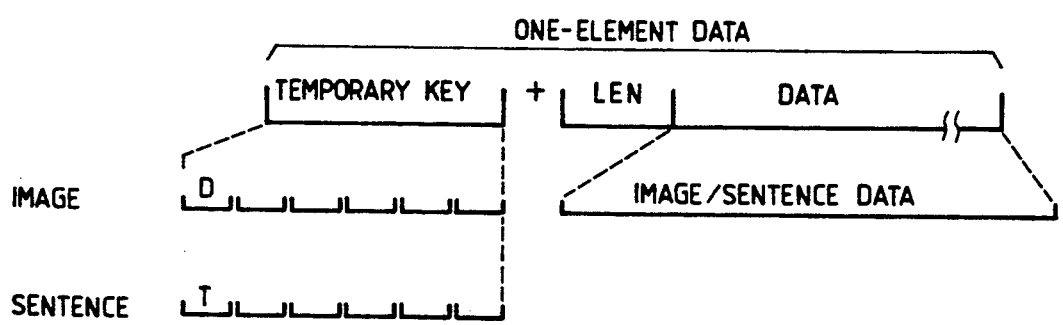
FIG. 5 represents the format of one data element when image data or document data is newly entered.

In FIG. 5, there is shown one element data registered in step S23.

When the data relating to the document which is entered in steps S7 and S8 is input into the personal computer 4-1, the entered data is edited as one element data (see FIG. 5) in the system controller 2, host computer 1, or personal computer 4-1.

If a judgement is made in step S6 that no document is entered, it is assumed that said input is machine sort information. Machine sort information is the data needed for repairs, tools to be used and the like for a bike. In accordance with the preferred embodiment of this embodiment, the machine sort information includes specification data, service data and torque data, which will be described in detail hereinafter.

(A) Specification data is, for instance, repair data on the bike, data representative of repair items, and details which are entered into a list indicating the tool to be used, and is constructed of alphanumerical data and KANJI characters. In other words, specification data represents a type of engine oil, a tool to be used, and items needed for repairs such as the inner diameter of a cylinder, the outer diameter of a piston, and the like.

(B) Service data is numerical data representative of, for instance, information needed for maintenance. It is entered into a list of maintenance data and has three different values, i.e., a maximum value, a minimum value, and a limit usage value (or a center value). Thus, maintenance data relating to the inner diameter of the cylinder comprises a typical maximum value, a minimum value, and the usable maximum value. Maintenance data concerning the outer diameter of the piston comprises typical maximum and minimum values, and the usable minimum value. As to data representing the capacity of an engine oil tank, the capacity of a coolant container, and the like, which does not discriminate between maximum and minimum values, the same values are input as both maximum and minimum values.

(C) Torcue data is numerical data indicative of the fastening torque of screws for the bike (maximum value, minimum value, and center value), the diameter of a screw, and the number of required screws. As will be discussed hereinafter, and as shown in FIG. 8, torque data includes five pieces of numerical information, i.e., a maximum value, a minimum value, a center value (or the limit value for usage) and two other items of information.

When a judgement is made that the input data is machine sort information, a machine sort code is entered which identifies the sort of bike to which the machine sort information to be input is related. As indicated in step S9 (FIG. 3B), this is done by utilizing any one of the personal computers 4-1 to 4-N (e.g., personal computer 4-1) connected to the host computer 1. The machine sort code is constructed of, for instance, 8 bytes, and "K", which represents that the machine sort code is related to machine sort information, is input into the head byte of the machine sort code.

In step S10, a judgement is made whether or not the machine sort information to be input is specification data. If the judgement is affirmative in step S10, then, an information identification code having, for instant, a 4-byte length is input in a step S11. At this time, "A", indicating that the information identification code is related to specification data, is input at the head byte of the identification code.

In a next step S12, an item having, for example, a 3-byte length is entered.

In a subsequent step S13, an image classification having, for instance, a 2-byte length is input. Information representing the language of the specification data (for example, the language is Japanese, or English) is provided by this image classification.

In step S21, specification data is entered by use of the personal computer 4-1.

In a subsequent step S22, the machine sort code, the information identification code, item and image classification information which have been input by the previous steps S9, S11, S12 and S13, the data status (which is automatically set in the host computer indicating the history of the specification information entered in the step S21, and the specification data are registered as one element data in the machine sort D/B 14 by means of the host computer 1. The format of one such element data is illustrated in FIG. 6. As also shown in FIG. 6, the data includes the machine sort code, the information identification code, the item, the image classification, and data status which, together, will be referred to as an element data key in the following description.

If no specification data is input in the previous step S10, another judgement is made in step S14 whether or not service data is being entered. If service data is entered, an information identification code is input in a step S15, similar to the input done in the preceding step S11, but in this case "B" is input into the head byte of the information identification code. In the next step S16, the item is input, similar to the input executed in step S12. Then, in step S17, the image classification is entered (as in step S13). The function of the image classification information entered at the time of entry of service data will be discussed later with reference to a step S42.

In step S21, service data is input by means of the personal computer 4-1. The service data provides three different values, i.e., a maximum value, a minimum value and a limit value of usage (or a central value). When these three data values are input in a specific unit in the editing device according to the preferred embodiment, these data are stored and also converted into other units to be stored thereafter.

FIG. 7 illustrates a format of one element data (an element data key and service data) which is registered in the machine sort information D/B 14 in the step S22. As illustrated in FIG. 7, the service data is constructed so as to be set in a first data section through a third data section. When the three data values are input, in step S21, in a preselected specific unit (for example "mm"), these data are set in the first data section. Although it is not shown in FIGS. 3 and 7, just before entry of the service data, a conversion classification (for example, 2-byte length data) is entered to indicate what other units the three data set in the first data section should be converted into. As a result, the three data entered in millimeter units into the first data section are converted into other units (e.g., inch units) designated by the conversion classification, and thereafter stored in the second data section. Then the three data in millimeter units stored in the first data section are converted into still other units designated by the conversion classification, and the resultant converted data are transferred to the third data section.

Referring to FIG. 10, the above-mentioned conditions will now be described in greater detail. FIG. 10 illustrates only the service data (element data) portion of the data shown in FIG. 7. Assume that the entered service data constitutes information about the inner diameter of the cylinder of the bike, and that the minimum value is 56.003, the maximum value is 56.018, and the limit value of usage is 56.08 (illustrated in FIG. 10 as the service limit) each of which is input in millimeter units. These numerical data are set in the first data section. If the conversion classification set before entry of the service data designates that millimeter units are to be converted into inch units, each of the data set in the first data section is converted into 2.2048, 2.2054, and 2.207 inches, respectively and the converted data are set in the second data section.

Each of the data set in the first data section is converted into still other units designated by the conversion classification, with these further converted data being set in the third data section.

In other words, the function of the conversion classification is to automatically convert the service data into certain units other than the originally input units when the service data is entered in certain specific units, and these converted data are thereafter set into the second and third data sections.

In steps S9 to S21, the respective data input by the personal computer 4-1 are edited as the machine sort information data illustrated in FIGS. 6 to 8 in the system controller 2, host computer or personal computer 4-1. Next, in step S22, the machine sort code, information identification code, item and image classification which have been entered in the previous steps S9, S15, S16 and S17, the data status (which is automatically fixed in the host computer 1) representing a history of the service data information entered in the step S21, and the service data information consisting of the first to third data sections, are registered as one element data in the machine sort information D/B 14 under the control of the host computer 1.

If it is judged in step S14 that no service data is entered, i.e., the judgement of step S14 is negative, this means that torque information is entered. When torque information is to be entered, the information identification code is entered in step S18 in a manner similar to that described in reference to steps S11 and S15, but at this time "C" is input in the head byte of the information identification code. In the subsequent step S19, the item is input, similar to steps S12 and S16. Then, in step S20, the image classification is entered. The function of the image classification entered during entry of torque information is similar to the function of image classification which will be described hereinafter in relation to step S42.

In the next step S21, the torque information is input into the personal computer 4-1. As noted previously, torque information is constructed of five pieces of data, i.e., a maximum value, a minimum value, a center value (or a limit value of usage), and two other pieces of data representative of other information, i.e., diameter and number (see FIG. 8). In the editing device, when these five pieces of data are input in specific units, similar to the above-mentioned entry of service data, these data are stored, and at least the first three pieces of data, i.e., the data other than the two pieces of data representing diameter and number, are converted into other units and then stored.

FIG. 8 illustrates the format of one element data (element data key and torque data) which is registered in the machine sort information D/B 14 in the step S22. As illustrated in FIG. 8, the torque data is arranged to be set in first to third data sections. In the step S21, when the torque data is entered in some particular unit (for example, "kg"), torque data in these units is set in the first data section. Although not shown in FIGS.

3A-3E and 8, a conversion classification is input just before entry of the torque information, for use in converting the five pieces of data set in the first data section into certain different units. As a result, at least the three pieces of data input in the "kg" unit into the first data section (i.e., the three pieces of data other than the two pieces of data representative of other information among the five pieces of data constituting the torque information) are converted into a different unit (e.g.,"lb" unit) designated by the conversion classification. Then, the converted data is set in the second data section.

In addition, at least the three pieces of data entered into the first data section in the "kg" unit are converted into still other units which are designated by the conversion classification, and thereafter the further converted data are set in the third data section. Thus, the conversion classification is used to automatically convert the torque data into units other than the units associated with the input torque data and these converted data are set into the second and third data sections in a manner similar to the case of the service data.

Since the torque data concerning diameter and number are not required in different units, no unit conversion is needed for these two pieces of data. It may be possible, of course, to perform a unit conversion on these two pieces of data along with the conversions of the other three data. In this case, however, it is necessary to prohibit use of the converted two pieces of data.

In the one element data illustrated in FIGS. 6 to 8, the byte lengths of the respective element data keys are identical to each other.

In step S22, and as shown in FIG. 8, the machine sort code, information code, item and image classification which have been input in the steps S9, S18, S19 and S20, the data status (which is automatically set in the host computer 1) representative of the history of the torque data which has been input in the step S21, and the torque data information consisting of the first to third data sections are registered as one element data by the host computer 1 into the machine sort information D/B 14.

In steps S22 or S23, when entry of one-image, one-document, or one piece of the machine sort information (these are referred to as "element data" hereinafter) is accomplished, a judgement is made in the next step S24 (FIG. 3C) whether or not the entry of the element data is to be continued. If the entry of element data is to be continued, the control process is returned to the step S3. If the entry of element data is not to be continued, the editing of the book is commenced at step S25. The editing is performed in one page units.

In step S25, a new book file is read out from the host computer 1 by any one of the personal computers 4-1 to 4-N connected to the host computer 1.

FIG. 11 illustrates an arrangement of the new book file. As shown in FIG. 11, the new book file is constructed of material supervision or ID information, staff-in-charge information, and starting page information. The material supervision or ID information is the title of a book to be newly produced or the supervising number. The staff-in-charge information is data representative of a staff person who is qualified or authorized to produce the new book. The starting page information indicates what page the book to be produced is commenced from, i.e., it indicates the first page of the new book. For instance, the second page may correspond to the starting page of a book to be distributed in Japan, whereas the eleventh page may correspond to the starting page of a book to be distributed in the United States.

The staff-in-charge information can be used to effect security supervision of a newly edited book, for example. That is to say, information relating to a staff person who is permitted to produce a new book is previously registered in the host computer 1, and the new book can be edited by a particular staff person only when he has been registered in the new book file in the host computer 1. Such security supervision can also prevent the editing of a book which is not allowed to be edited or it can prevent a previously edited book from being unnecessarily and mistakenly revised by the editing device.

The staff-in-charge information may be preferably encrypted or stored in a magnetic card.

After the new book file is read out, predetermined data is input into this file at a step S26. When the predetermined data has been entered, as shown in a step S27, the new book file is transferred from the host computer 1 to the system controller 2 and then registered in the book D/B 21.

In the next step S28, the layout code (see FIG. 4) is entered by the keyboard 5-1, so that the basic layout code previously registered in the basic layout D/B 23 is called up to CRT 6. When the basic layout code is called up in the editing means, both the document supervision number and the page number to be edited are then input in step S29. The document supervision number is the title or the supervision or ID number of the new book, which is similar to the document supervision number of the new book producing file shown in FIG. 11.

Figure 12:
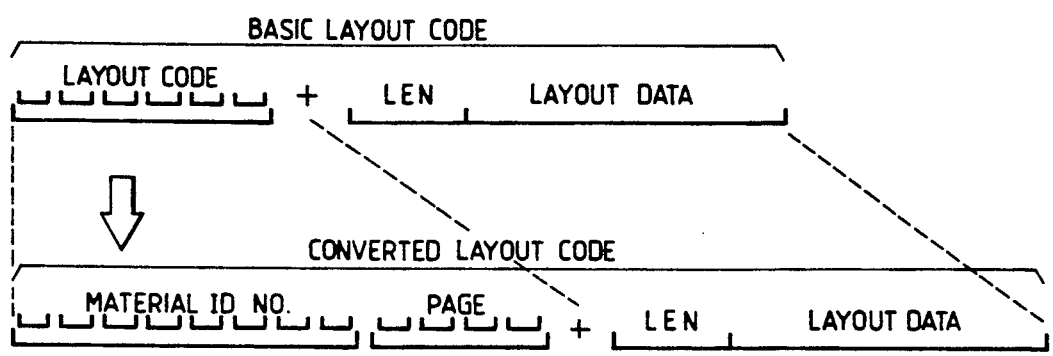
FIG. 12 illustrates how a converted layout code is produced from a basic layout code.

After the document supervision number and the page number to be edited are input in step S29, the editing means 3-1 converts the layout code portion of the basic layout code read in the step S28 into the document supervision number and the page number which have been input in the step S29, as illustrated in a step S30 and FIG. 12.

Upon completion of the code conversion, the editing means 3-1 stores the document supervision number, the page number, the LEN, and layout data in the editing means 3-1 in a step S31. The document supervision number, page number, LEN and layout data will be referred as the "converted layout code" in the following description.

Figure 13:
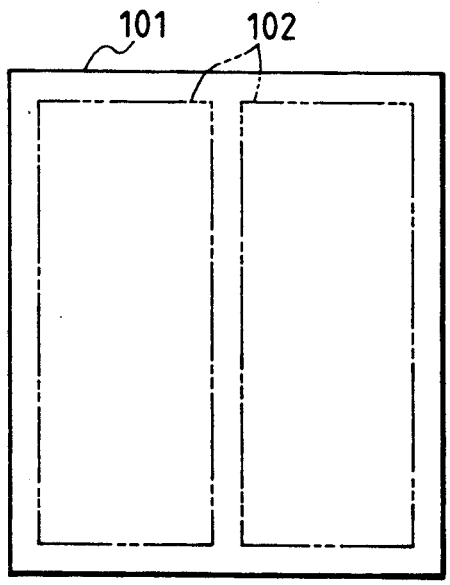
FIG. 13 illustrates one example of a display screen of the basic layout.

In step S32, the basic layout is displayed on CRT 6 by employing the converted layout code. As illustrated in FIG. 13, the basic layout comprises a contour 101 of a page to be edited and a document entry region 102. The basic layout shown in FIG. 13 is a double frame.

In a subsequent step S33 (FIG. 3D), a judgement is made whether or not the image is displayed on CRT 6. To display the image, the temporary key (see FIG. 5) is entered by the keyboard 5-1 in a step S34 so as to call up one element data, i.e., the temporary key, the LEN of the image data to be called up, and the image data from the element D/B 22, and the image data called up is displayed on CRT 6.

Figure 14:
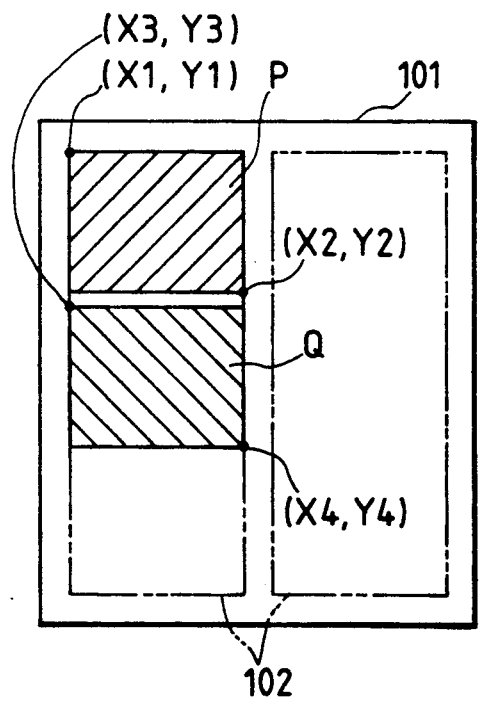
FIG. 14 illustrates one example of a display screen during the editing operation.

In step S35, by use of a mouse (not shown) connected to the keyboard 5-1, the image displayed on CRT 6 is moved to a desirable position on the basic layout. FIG. 14 illustrates an image of the screen of CRT 6 at that moment, which is similar to the illustration of FIG. 13. As shown in FIG. 14, when the image is moved to the region denoted by "P", the upper left coordinates and lower right coordinates of the image are (X1, Y1) and (X2, Y2), respectively. When the image is transferred in this way, the upper left coordinates (X1, Y1) and lower right coordinates (X2, Y2) on the basic layout are entered into the editing means 3-1. While the image is moved, the size of the image may be enlarged or reduced in accordance with the capability of the editing means. Only the image can be moved over the document input region 102.

Figure 15:
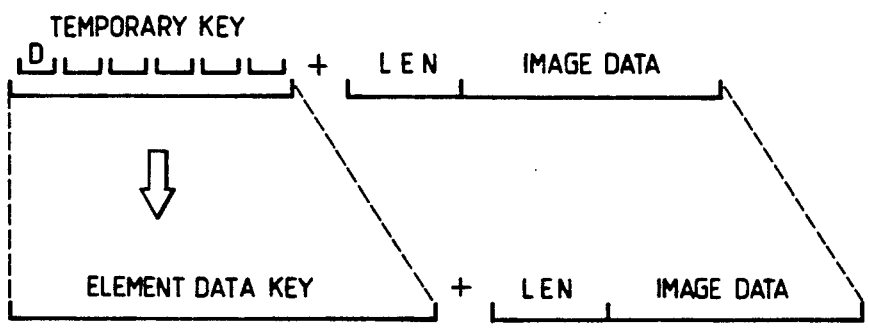
FIG. 15 illustrates how a temporary key of one element data of newly input image information is converted into an element data key.

In step S36, and as illustrated in FIG. 15, the temporary key portions of the 1-element data (consisting of the temporary key, LEN of image data to be called up, and image data) is converted into the element data key. As illustrated in FIG. 9, the element data key is constructed of the machine sort code, information identification code, item, image classification, and data status (which is automatically input in the host computer 1) representative of a history of image data, which is similar to the machine sort information including the specification information, service data information, and torque information.

The conversion of the temporary key into the element data key in step S36 is performed when an editor has entered the portions of the element data key other than the data status, and "D" is input in the head byte of the information identification code. The byte length of the element data key shown in FIG. 9 is identical to the respective byte lengths shown in FIGS. 6 to 8.

In step S37, the 1-element data consisting of the element data key, LEN of the image data corresponding to the element data key and the image data, and the coordinates (X1, Y1), (X2, Y2), are registered in the editing apparatus 3-1.

In step S45, another judgement is made whether or not the editing of one page is completed. If not, the control process returns to step S33.

If it is judged in step S33, that the image is not displayed on CRT 6, another judgement is made in step S38 whether or not a document or sentence is displayed. When the document or sentence is displayed, in a step S39 the temporary key (see FIG. 5) is entered by the keyboard 5-1, and the one element data consisting of the temporary key, LEN of the document data to be called up, and the document data themselves is called up from the element D/B 22, and the document data are displayed on CRT 6.

By employing the mouse (not shown) connected to the keyboard 5-1, the document displayed on CRT 6 is moved to the desired position on the basic layout in a step S40. When the document is moved to the position indicated by the symbol "Q" on the basic layout shown in FIG. 14, the upper left coordinates and the lower right coordinates of the document are (X3, Y3) and (X4, Y4), respectively. After the document has been moved, both the upper left coordinates (X3, Y3) and the lower right coordinates (X4, Y4) of the document on the basic layout are input into the editing means 3-1 (S40).

Figure 16:
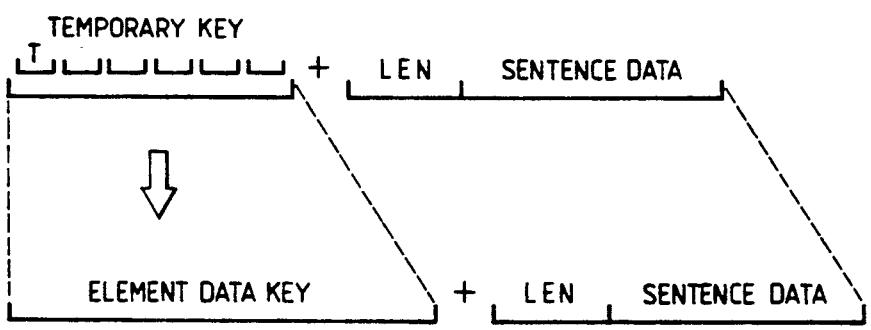
FIG. 16 illustrates how a temporary key of one element data of newly entered document information is converted into an element data key.
Figure 17:
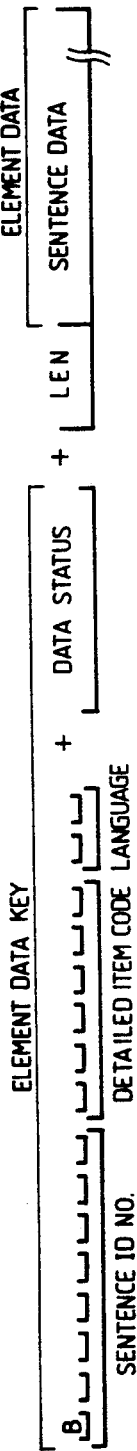
FIG. 17 illustrates the data format of a document information element which is converted during the editing operation.

In step S41, and as illustrated in FIG. 16, the temporary key in the one element data consisting of the temporary key, LEN of the called up document, and document data is converted into the element data key. Formats of these element data key, LEN of the called up document data, and document data are illustrated in FIG. 17. As shown in FIG. 17, the element data key corresponding to the document data is constructed of the sentence supervision number having a length of, for instance, 8 bytes, the detailed item code having a length of, for example, 6 bytes, the language information having a length of, for example, 2 bytes, and the data status (which is automatically added by the host computer 1) indicative of a history of the sentence or document data.

The sentence supervision number is the data used to specify each document, and "B" is input into its head byte. The language information indicates the language in which the document data has been produced, for example, Japanese or English. The detailed item code is a classification code of the document or sentence.

It should be noted that after the data status of the 1-element data shown in FIG. 17, an appropriate number of blanks are added to make the byte length of the element data key equal to that of the respective element data keys as shown in FIGS. 6 to 9. In other words, the byte lengths of the element data key portions of the document data, image data and machine sort information data are identical with each other.

By employing the detailed item code, the editing means can retrieve the document or sentence. This document retrieval operation will be discussed later in a step S114.

In step S37, the element data key, LEN of the document data corresponding to the element data key, and document data are registered as the 1-element data together with the coordinates (X3, Y3), (X4, Y4) into the editing means 3-1.

If a judgement is made in step S38 that no document is displayed on CRT 6, this means that machine sort information is to be displayed. In step S42, the element data key of the machine sort information to be called up is input by the keyboard 5-1, whereby the machine sort information having 1-element data, i.e., an element data key, specification information, service data information or torque information is called up from the machine sort information D/B 14 to the editing means 3-1, and then the specification information, service data information or torque information is displayed on CRT 6.

In the preferred embodiment, the element data key is entered by the keyboard 5-1, and the machine sort information is directly called up via the host computer 1 and system controller 2 from the machine sort information D/B 14 to the editing means 3-1. However, alternatively, employing any one of the personal computers 4-1 to 4-N, the machine sort information may be called up from the machine sort information D/B 14 to be temporarily registered into the element D/B 22. Thereafter, the element data key may be input by the keyboard 5-1, and the machine sort information may be called up via the system controller 2 from the element D/B 22 to the editing means 3-1.

It should be noted that display conditions or modes of the service data information and torque information among the machine sort information data are determined in accordance with the image classification information in the element data key and the conversion classification (not shown) described with reference to the step S21.

As to the service data, for instance, as illustrated in FIG. 10, after the data set in the first data section has been automatically converted and set within the second and third data sections in accordance with the conversion classification information previously set, the service data is displayed on CRT 6 in the format illustrated in FIG. 25 in accordance with its conversion classification and image classification. FIG. 25 is a table representing one example of a relationship between the conversion classification, image classification and service data, which is displayed on the CRT. In FIG. 25, if the conversion classification is "10" and the image classification is "10", only the data set in the first data section (see FIG. 10) is displayed on CRT 6 in millimeter units. If the conversion classification is "10" and image classification is "20", the data set in the first data section is displayed in millimeter units, and subsequently the data set in the second data unit is displayed within parentheses in inch units.

If the conversion classification is "20" and image classification is "10", only the data set in the second data is displayed in inch units. When the conversion classification is "20" and image classification is "20", the data set in the second data is displayed in inch units, and subsequently the data set in the first data unit is displayed within parentheses in millimeter units.

When the conversion classification is "40", the data and units display is the same as in the conversion classification "10" but the decimal point is a comma rather than a period.

In a manner similar to steps S35 and S40, the machine information data is positioned on the basic layout and the coordinates thereof is input in a step S43. In a subsequent step S44, the element data key and its coordinates information selected from the 1-element data, as illustrated in FIGS. 6 to 8, are registered into the editing means 3-1. Not only the element data key, but also the respective element data together with the coordinates information thereof, may of course be registered.

Figure 18:
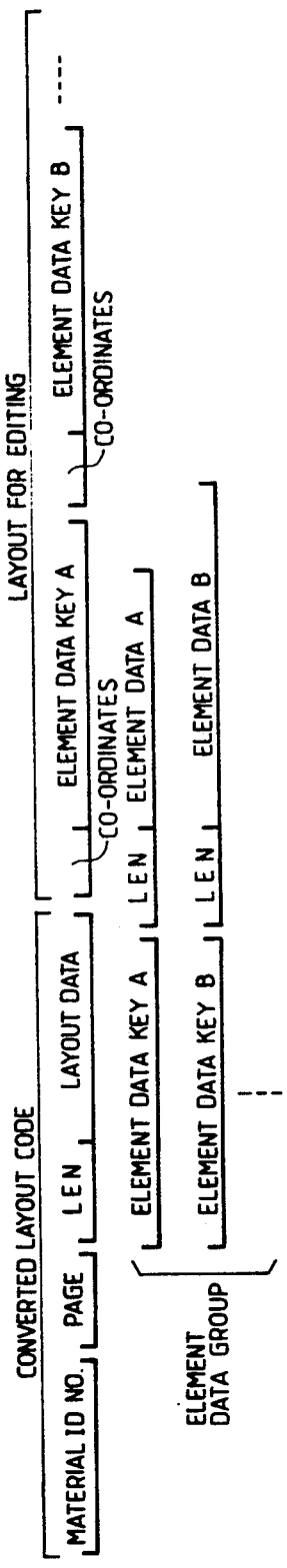
FIG. 18 illustrates the data format of one page which is edited by the editing machine.

When a judgement is made that the editing of one page is finished in the step S45, the format of one page data is converted in step S46 into another format shown in FIG. 18. This conversion is executed in the editing means for performing the editing (the editing means 3-1 in this case). As shown in FIG. 18, the one page data converted in the editing means is constructed of the following data:

(a) The converted layout code which has been converted in step S30 (see FIG. 12);

(b) The coordinates entered in steps S35, S40 or S43, and the element data key of the 1-element data arranged in the region designated by said coordinates. When a plurality of element data (image data, document data, or machine sort information data) are arranged within one page, plural sets of the coordinates and element data key should be stored for one page. The coordinates and element data key are set subsequent to the converted layout data. A set of coordinates and element data keys will be referred to as a "layout for editing" data portion in the following description; and (c) The element data key of the element data arranged within one page, LEN of the element data, and the element data. When a plurality of element data are inserted in one page, plural sets of the element data key, LEN, and element data should be arranged for one page. In other words, the number of the 1-element data constituted of the element data key, LEN and element data is same as that of a pair of the coordinates and element data key contained in the layout for editing data portion.

The element data key, LEN and element data are set subsequent to the layout for editing data portion. When the element data is machine sort information no LEN is present in front of the element data (see FIGS. 6-8) and therefore only the element data key and element data are set. These data arranged behind the layout for editing data portion will be referred to an element data group in the following description (see FIG. 18).

Although not shown in FIG. 18, an end code for indicating that one page data is completed is added at the end of the final element data.

When one page data is converted as illustrated in FIG. 18, the resultant converted one page data is registered via the system controller 2 in the book D/B 21 in the step S47.

In the next step S48 (FIG. 3E), one page data which has been converted in step S46 is transferred to the host computer 1. If the host computer 1 is not in operation due to a holiday or the like, the processes up to step S47 may be repeatedly performed, and several pages of data which have been registered in the book D/B 21 may be transferred later after the host computer 1 is back in operation.

Figure 19:
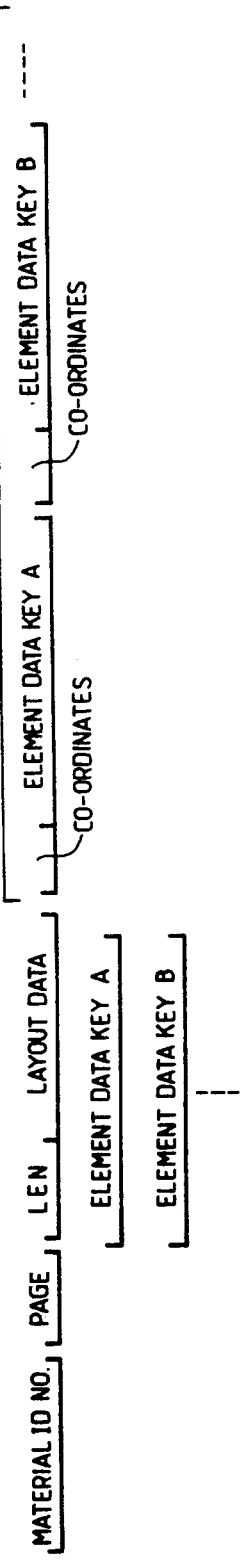
FIG. 19 illustrates the data format of one page which is converted by the host computer so as to be registered into the layout D/B 11.

In step S49, the above-described one page data is duplicated and the format thereof is converted into that illustrated in FIG. 19 in the host computer 1. FIG. 19 illustrates one page layout information which is converted in the host computer 1 so as to be registered for registration in the layout D/B 11.

The one page data transferred to the host computer 1 is distributed and stored in the respective D/B's (i.e., layout D/B 11, document D/B 12, image D/B 13 and machine sort information D/B 14) connected to the host computer 1. The data conversion executed in step S49 is performed so as to store in the layout D/B 11, only the information relating to layout among the one page data. More particularly, as is obvious from a comparison of FIGS. 18 and 19, in step S49 both LEN and the element data are removed from the element data group of the 1-page data. In a next step S50, the data converted in step S49 is registered in the D/B 11.

In step S51, the element data group is copied by employing the 1-page data which was transferred to the host computer 1 in the previous step S48. In step S52, the data relating to the document data among the element data group is registered in the document D/B 12. In step S53, t he data relating to the image data among the element data group is registered in the image D/B 13.

In step S54, a judgement is made whether or not the edited one page data is to be printed. If no printing operation is to be carried out, the control process is advanced to a step S57. If the printing operation should be performed, the control process is advanced to a step S55.

In step S55, both the reference supervision number and page are entered by use of the keyboard 5-2, so that the 1-page data registered in the book D/B 21 is called up into the editing means 3-2. In step S56, the 1-page data is printed out by the printer 7.

In step S57, a judgement is made whether or not the next page should be edited. When the next page is to be edited, the control process is returned to the step S28. Conversely if the next page is not to be edited, the control process is ended.

In accordance with the first editing method described above, a new book is produced or edited.

Referring now to FIGS. 20A to 24, in a manner similar to the description on the first editing method, a description will be given of the second editing method used to produce a service manual for a bike or the like.

FIGS. 20A-20G are a flowchart illustrating the second editing method according to a preferred embodiment of the invention. In the respective steps shown in FIG. 20A-20G, reference numerals that are the same as those in FIG. 3A-3E indicate the same or similar processing operations.

According to the second editing method, in a step S25 (FIG. 20A), a new book editing file which has been registered in the host computer 1 is first called up by employing any one of the personal computers 4-1 to 4-N (for instance, the personal computer 4-1) connected to the host computer 1. Since the arrangement of this new book editing file is identical to that shown in FIG. 11, a further description thereof is omitted.

After the new book editing file is called up, predetermined data, i.e., the material supervision number, staff-in-charge information and the starting page are entered into the file in a step S26. Then, in a step S27, the new book editing file is transferred by the host computer 1 to the system controller 2 and registered in the book D/B 21.

In step S101, referring to one or more books which had been produced previously in the editing device (referred to as "original books"), a selection is made of the pages of the original books that are to be utilized to produce a new book. For example, the page selection might select the 21st to 30th pages of a first original book for use in producing the 1st to 10th pages of the new book, the 46th to 50th pages of a second original book for use in producing the subsequent 11th to 15th pages of the new book, and the 31st to 40th pages of the first original book for use in producing the succeeding 16th to 25th pages thereof. This process step is performed while an operator actually observes the original books.

In a next step S102, the material supervision number and the page number of a selected page of the original book are input by way of the personal computer 4-1, and 1-page data (see FIG. 19) is copied in the host computer 1 from the layout D/B 11. In step S103, a new material supervision number and the new page number of the book to be newly edited are input into the personal computer 4-1. In step S104, both the document supervision number and the page number in the 1-page data copied in step S102 are rewritten by the new material supervision number and the page number of the new book input in step S103.

Figure 21:
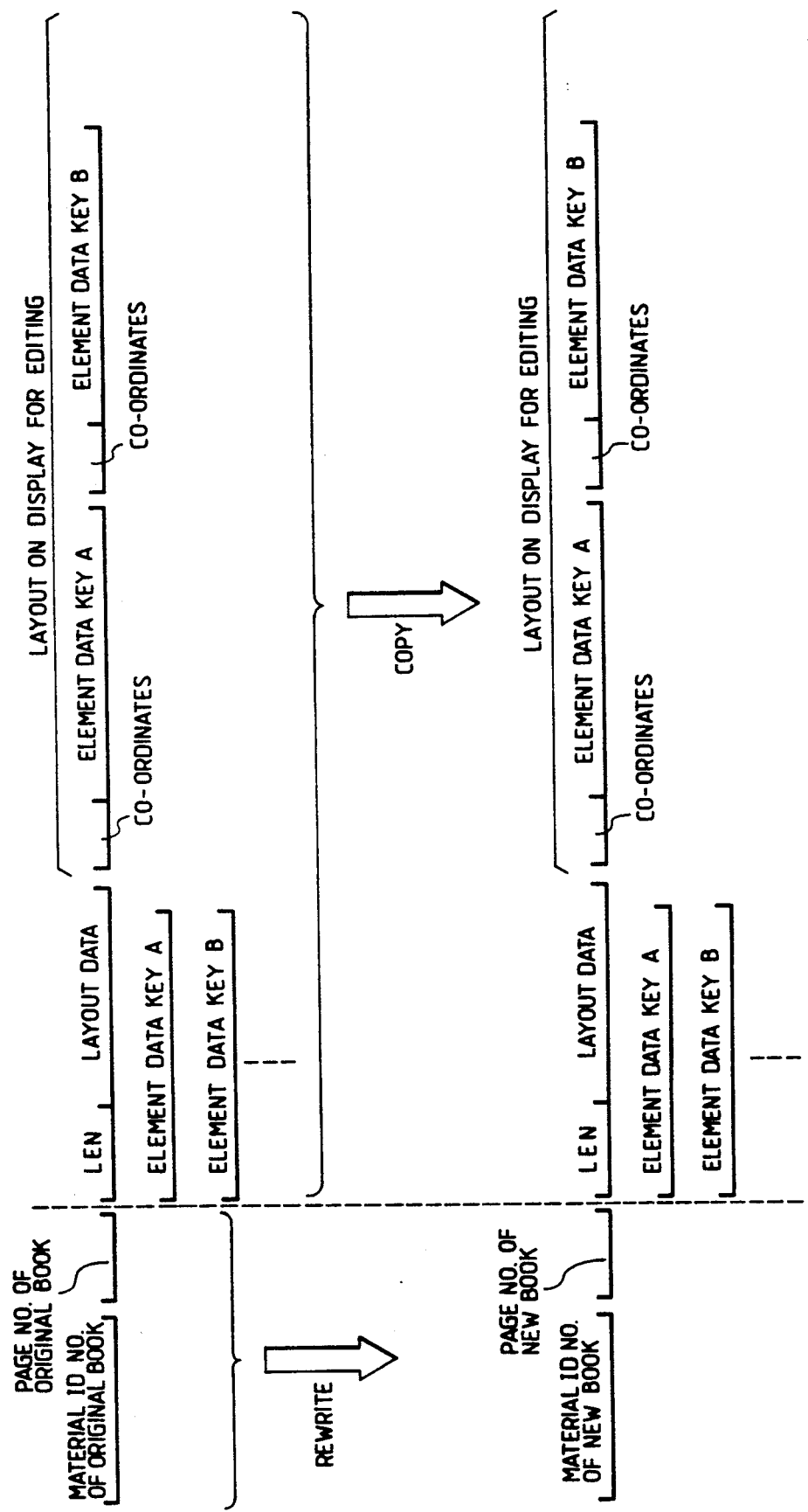
FIG. 21 illustrates how the data rewriting step S104 of FIG. 20 is performed.

FIG. 21 illustrates the data rewriting operation executed in step S104. The 1-page data of the original book which has been called up and copied in step S102 is shown in the upper portion of FIG. 21. In step S104, as illustrated in the lower portion of FIG. 21, only the material supervision number and page number portions of this data are rewritten by those of the new book.

In step S105, the 1-page data produced in this way is stored in the host computer 1.

In step S106, a judgement is made whether or not the rewriting of the material supervision number and the page number has been completed for the new book. More particularly, in accordance with the previous example, a judgement is made whether or not all of the 21st to 30th pages of the first original book, the 46th to 50th pages of the second original book, and the 31st to 40th pages of the first original book have been converted into the 1st to 25th pages of the new book. If the rewriting operation is not completed, the control process is returned to step S102 but if the rewriting operation is completed, the control process is advanced to a step S107 (FIG. 20B).

In step S107, the element data or both the LEN and element data corresponding to the element data keys of the 1-page data converted in the step S104 are called up from the respective D/B's 12 to 14. These data are added after the respective element data keys of the 1-page data, i.e., the 1-page data converted in step S104 is rearranged in a complete form as shown in FIG. 18.

In step S108, a judgement is made whether or not such element data has been added to all pages of the new book. If all pages have not yet been rearranged in the foregoing manner, the control process is returned to step S107. When all pages are so rearranged, the control process is advanced to a step S109.

In step S109, the data of the new complete book is transferred from the host computer 1 to the system controller 2.

In step S110, all pages of one complete book are registered in the book D/B 21 by the system controller 2. As noted previously, editing can be effected even when the host computer 1 is not in operation for some reason if all pages of one complete book are registered in the book D/B 21 connected to the system controller 2.

In step S111, the new material supervision number and the page number of the new book are entered by the keyboard 5-1 into the editing apparatus 3-1. In step S112, the input page data of the new book is read out from the book D/B 21 to be registered in the editing means 3-1. Then, in a next step S113, the page called up from the book D/B 21 is displayed on CRT 6.

Figure 20C:
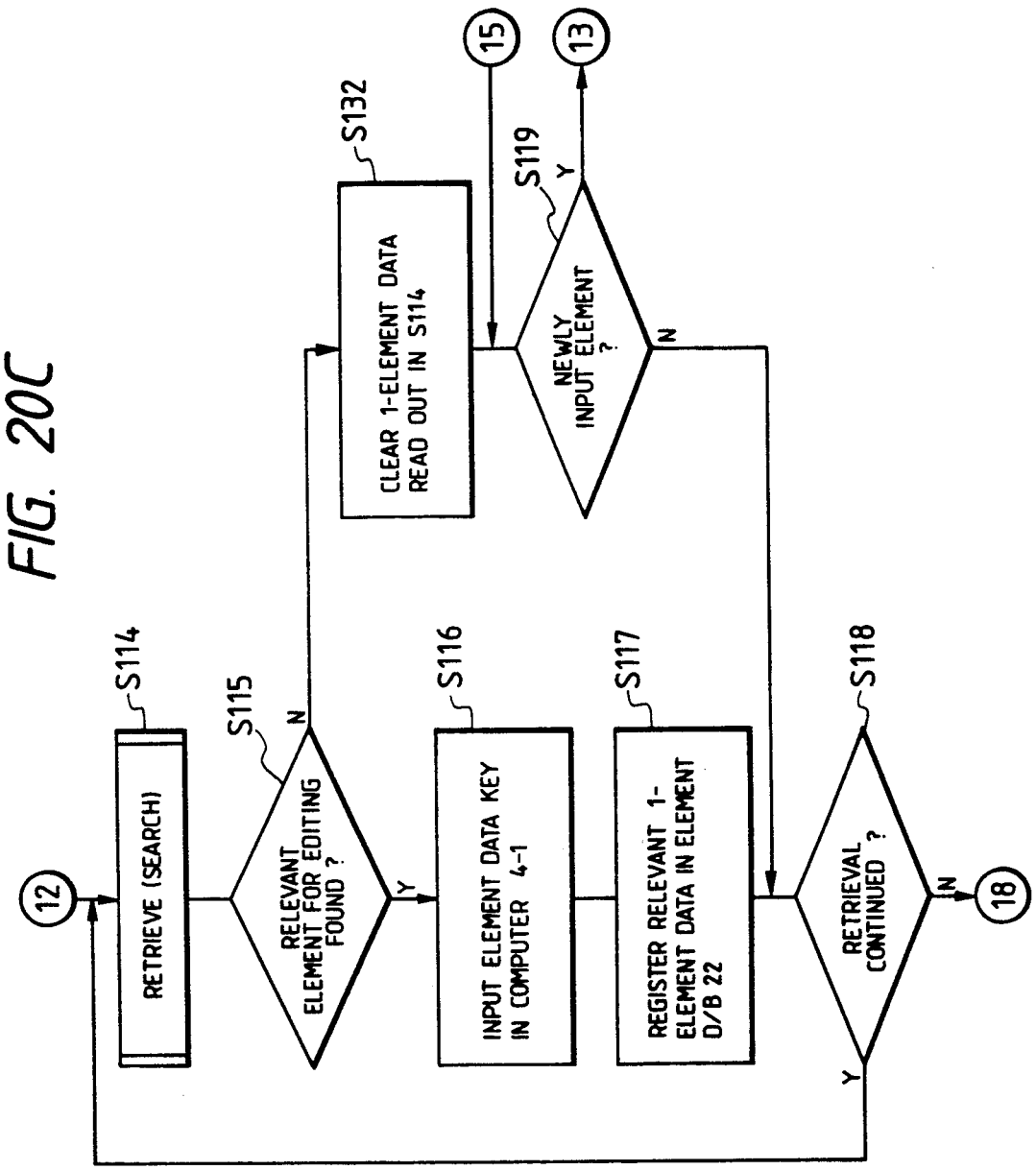
Figure 20D:
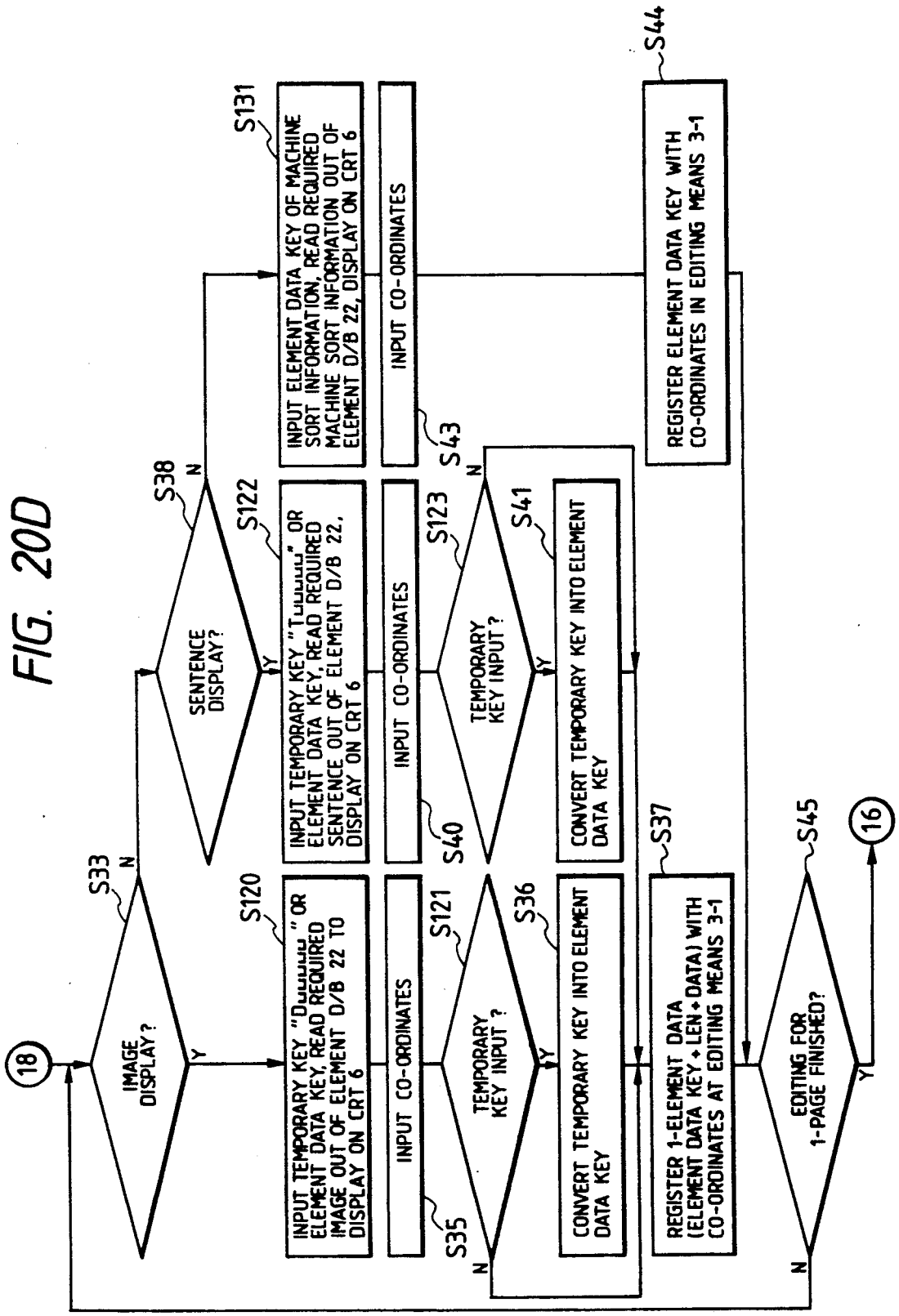

In step S130, a judgement is carried out whether or not the 1-page data displayed on CRT 6 requires editing, i.e., whether or not the pages which have been copied from the original books for the new book in steps S102 to S104 can be utilized as is, without any further editing. If no further editing is required, the control process advances to step S46 (FIG. 20G). If further editing is required, the control process is advanced to a step S114 (FIG. 20C).

In step S114, a retrieval operation is performed by any one of the personal computers 4-1 to 4-N to determine whether or not elements of an original book (including the original book selected in the previous step S101) can be utilized for editing the page of the new book displayed on CRT 6. The retrieval method will be discussed later with reference to FIGS. 22 to 24. In step S115, a judgement is made whether or not an element usable in the new book editing operation has been found in the retrieval operation. If some relevant elements are found, the element data key of the retrieved relevant elements are input in the personal computer (for example, 4-1) in a step S116. In step S117, the 1-element data called up by the above retrieval operation is transferred to the system controller 2, and is registered in the element D/B 22 under the control of the system controller. Then, in a step S118, a judgement is made whether or not the retrieval operation is to be continued. If it is to be continued, the operation is returned to the step S114.

If an element usable for editing the new book is not found in the step S115, the 1-element data retrieved in the step S114 is cleared in a step S132. The data stored in D/B's 12 to 14 is not cleared at this stage.

Figure 20E:
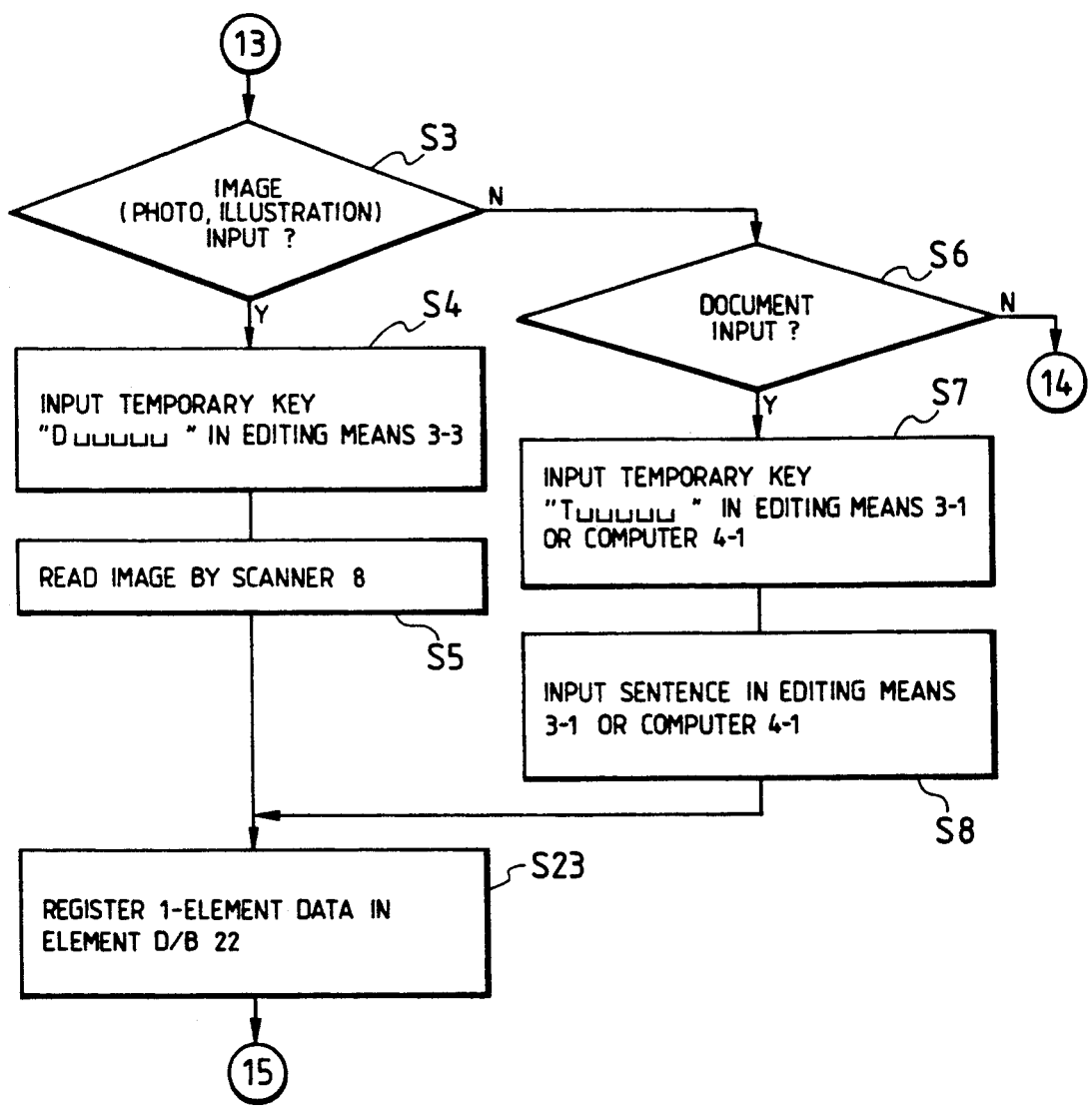
Figure 20F:
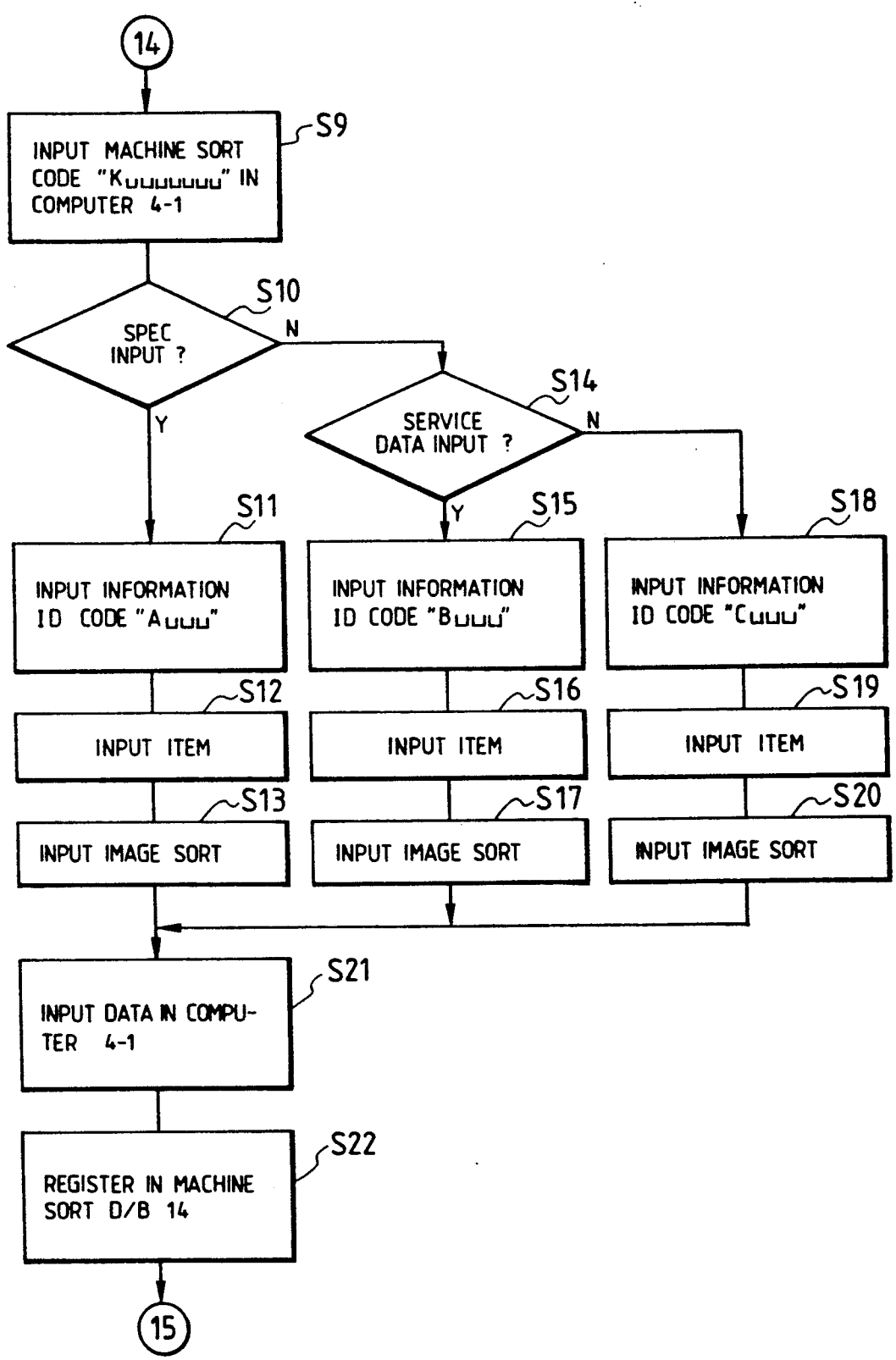

In step S119, a judgement is made whether or not the input image data, document data or machine information data is a newly input element. If the element is not newly input, control is returned to step S118. When the element is newly input, the control process is advanced to step S3 (FIG. 20E). Since the processes effected in steps S3 to S23 are same as those denoted by the same reference numerals in FIG. 3A-3G, the descriptions thereof are not repeated here. After the control process defined by step S22 (FIG. 20F) or S23 (FIG. 20E) is completed, control is returned to step S119.

If it is determined in step S118 that the retrieval operation is not to be continued, another judgement is made in step S33 (FIG. 20D) whether or not the image is to be displayed on CRT 6. If the image is to be displayed, the temporary key or element data key of the image to be displayed is input by the keyboard 5-1 in step S120, and the predetermined image is read out from the element D/B 22 and then displayed on CRT 6.

In the next step S35, the image is moved to the desired position and the coordinates thereof are input.

In the step S121, a judgement is made whether or not the temporary key was input in the previous step S120. When the temporary key has been input, it is converted into the element data key in step S36. The data conversion has been described with reference to FIG. 3 (FIG. 31-3E), so no further description is given here.

If the judgement is that no temporary key was entered in step S121, or after the process of step S36 is accomplished, the element data key, LEN of the image data corresponding to the element data key and the image data itself are registered as one element data into the editing means 3-1 together with the coordinates input in step S35.

If a judgement is made in step S33 that the image is not to be displayed, another judgement is made in step S38 whether or not a document or sentence is to be displayed. When a document is to be displayed on CRT 6, the temporary key or element data key to be displayed is entered by the keyboard 5-1 in a step S122, and the predetermined document is called up from the element D/B 22 to be displayed on CRT 6. In a subsequent step S40, the document is moved to the desired position and the coordinates thereof are entered.

In step S123, a judgement is made whether or not the temporary key was input in the previous step S122. When the temporary key has been input, it is converted into the element data key in step S41. This key conversion is carried out in the same way as the conversion effected in the preceding step S36. If it is judged that no temporary key was input in step S123, or after the process effected in the step S41 is accomplished, the element data key, and both the LEN and the sentence data of the document data corresponding to the element data key, are registered as one element data into the editing means 3-1 together with the coordinates input in the preceding step S35.

If a judgement is made in step S38 that no sentence is to be displayed, it is judged that machine sort information is displayed, and the control process is advanced to a step S131. In step S131, the element data key of the machine sort information to be displayed is entered by the keyboard 5-1 and the predetermined machine sort information is called up from the element D/B 22 to be displayed on CRT 6. In the next step S43, the machine sort information is moved to the desired position and the coordinates thereof are input. In step S44, the element data key is registered, together with the coordinates entered in step S43, in the editing apparatus 3-1.

When process step S37 or S44 is completed, a judgement is made whether or not the 1-page data displayed on CRT 6 has been edited. If not, the process is returned to the step S33. If editing is completed, then the process is advanced to step S46 (FIG. 20G). In step S46, the edited one page data is converted in editing means 3-1 to the form illustrated in FIG. 18. In the next step S124, the converted one page data is updated in the book D/B 21. Since the processes defined in the next following steps S48 through S57 are the same as those denoted by the same reference numerals of FIGS. 3A-3E, the explanations thereof will not be repeated here. If in step S57, the judgement is made that it is necessary to edit a next page, the control process is returned to the step S111 (FIG. 20B).

Although in the foregoing explanation with reference to FIGS. 20A-20G, the retrieval operation was executed before the 1-page data was edited in steps S33 and thereafter, and the necessary data were read out of the D/B 12 through 14 to be registered in D/B 22, these processes may be performed during the editing operation.

A detailed description will now be given of the document data retrieval operation (step S114 of FIG. 20C). The retrieval operation of step S114 is performed by use of any one of the personal computers 4-1 to 4-N.

Figure 22:
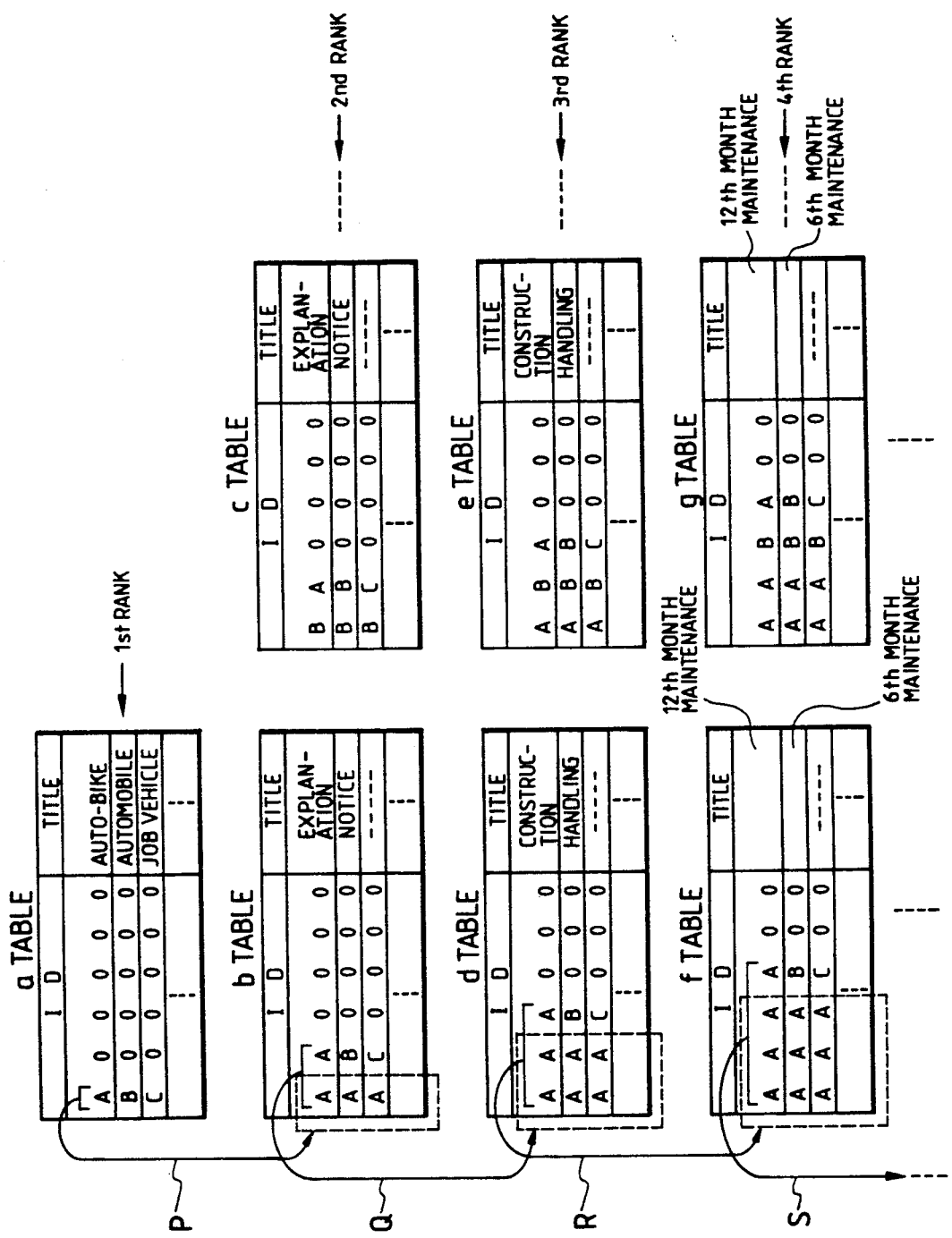
FIG. 22 is a schematic diagram showing a portion of a table for retrieving document data set in the document D/B 12.

FIG. 22 is a schematic diagram showing portions of tables, used for document data retrieval, which have been previously set in the document D/B 12. A symbol "0" indicated in the respective tables of FIG. 22 represents "null", or that no data is entered. As illustrated in FIG. 22, a plurality of document data retrieval tables, each consisting of an index (referred to as "ID") and a title, have been input and set in document D/B 12. The byte length of the ID is set to be equal to that of the detailed item code (6 bytes in the preferred embodiment) so as to correspond to the detailed item code of the element data key which in turn corresponds to the document or sentence data shown in FIG. 17.

In an a-table of FIG. 22, different data such as A, B, C, and so on, are respectively input only in the head byte (first byte) of an ID having a 6-byte length.

In a b-table of FIG. 22, the common data of "A" is input in the first byte of each ID, and the different data of "A, B, C" are respectively input in the second byte thereof.

In a c-table of FIG. 22, the common data of "B" is entered in the first byte of each ID and the different data of "A, B, C" are entered, respectively, in the second byte thereof.

In a d-table of FIG. 22, the common data of "AA" is input in the first and second bytes of each ID, and the different data of "A, B, C" are entered, respectively, in the third byte.

In an e-table of FIG. 22, the common data of "AB" is input in the first and second bytes of each ID, and the different data of "A, B, C" are entered, respectively, in the third byte thereof.

Similarly, in an f-table of FIG. 22, the common data of "AAA" is input in the first to third bytes of each ID, and the different data of "A, B, C" are entered, respectively, in the fourth byte thereof.

In a g-table of FIG. 22, the common data of "AAB" is input in the first to third bytes of each ID, and the different data of "A, B, C" are entered, respectively, in the fourth byte.

Figure 23:
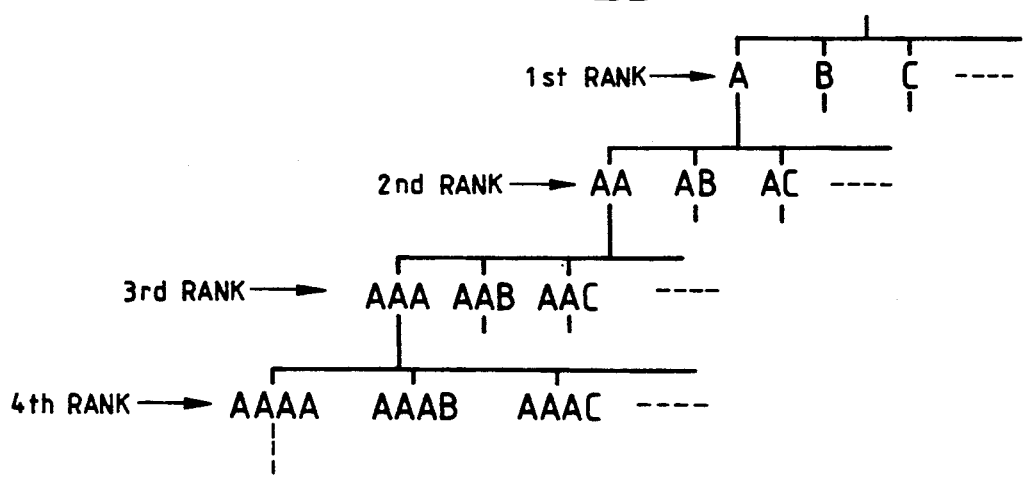
FIG. 23 is a schematic diagram representing a hierarchical structure of a document retrieval table.

Thus, the respective tables in document D/B 12, used for the document data retrieval operation, are formed in a hierarchical structure as illustrated in FIG. 23.

In practice, each of the tables is formed by the following method. In correspondence to the respective ID's in the a-table of the first rank where the data has been input in only the first byte of each ID, each title (autobike, automobile, or special-purpose car etc.) representative of the first highest concept of the document data is input. In correspondence to each of ID's in the b-and c-tables of the second rank, where the data has been input in only the first and second bytes of each ID, another title (explanation, or notice etc.) representative of the second highest concept is input. Similarly, a further title (structure explanation, operating or handling manual etc.) representative of the third rank concept is input in the d and e-tables of the third hierarchy, and a still further title (twelfth month maintenance, or sixth month maintenance, etc.) indicative of the fourth rank concept is input in the f and g-tables of the fourth hierarchy. Data that is the same as the ID representative of the lowest concept is previously input in the detailed item code of the element data key shown in FIG. 17. Then retrieval of the document data is performed as illustrated in FIG. 24.

It should be noted that the lowest rank data need not be set in the table of the sixth hierarchy, but may be set in a table higher than the sixth hierarchy.

Figure 24:
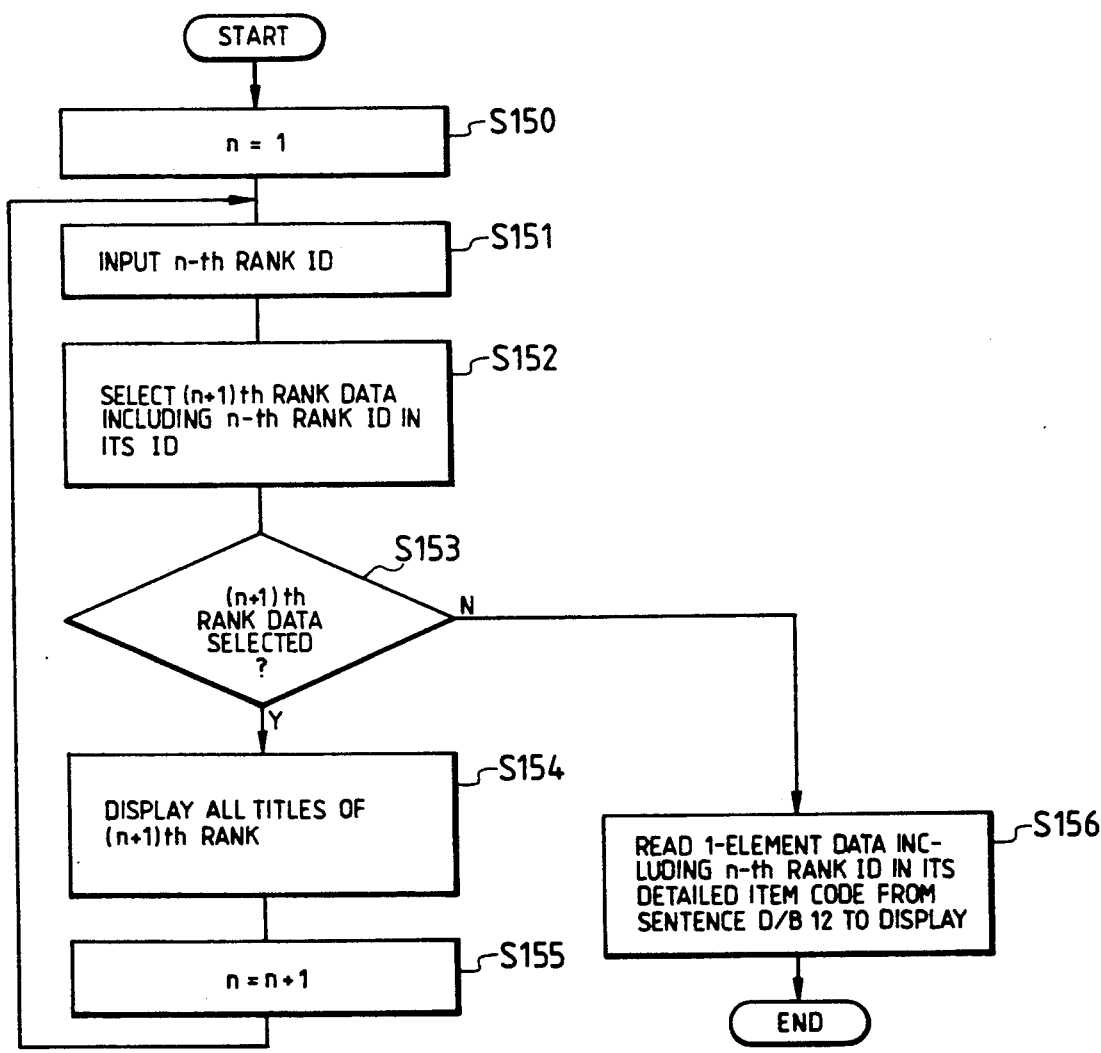
FIG. 24 is a flowchart of a retrieval method according to one preferred embodiment of the invention.

FIG. 24 is a flowchart of the retrieval method performed in step S114 according to one preferred embodiment of the invention. As previously described, the retrieval operation is carried out by any one of the personal computers 4-1 to 4-N.

In step S150 of FIG. 24, first "n" is set to be 1. In step S151, the ID of the n-th hierarchy or rank is input by, for instance, personal computer 4-1. In step S152, the (n+1)th hierarchy data containing the n-th rank ID in its ID is selected from the table for the document data retrieval operation.

In step S153, a judgement is made whether or not the (n+1)th rank data is present, namely, whether the (n+1)th rank data has been selected in step S152. If yes, then all titles of the (n+1)th rank are displayed in step S154. Then, after 1 is added to "n" in step S155, the control process is returned to step S151.

When a judgement is made in step S153 that the (n+1)th hierarchy data is not present, the control process is transferred to the step S156. In step S156, the 1-element data containing the n-th rank ID in its detailed item code (i.e., the 1-document or 1-sentence data shown in FIG. 17) is called up via the host computer 1 from the document or sentence D/B 12 and displayed in the personal computer 4-1.

Consequently, when the tables used for document data retrieval are constructed as in FIG. 22, and "A" is input as ID only to the first byte, the b-table of the second hierarchy or rank, where "A" is set in the first byte, is selected and displayed as indicated by arrow P. Then, when "AA" is input in the first and second bytes as ID, the d-table of the third rank where "AA" is set in the first and second bytes, is displayed as denoted by arrow Q. Similarly, when "AAA" is entered as ID in the first to third bytes, the f-table of the fourth rank where "AAA" is set in the first to third bytes, is displayed as shown by arrow R. Furthermore, when "AAAA" is input as ID into the first to fourth bytes for the retrieval operation, the list of the fifth rank (not shown), where "AAAA" is set in the first to fourth bytes, is displayed as denoted by arrow S.

According to the foregoing method, such a retrieval operation can be effected to locate documents or sentences such as twelfth month maintenance manual registered with respect to the structure of, for example, an auto-bike. When such a retrieval operation is performed for the list of the lowest rank, a judgement can be made whether or not the required document data is registered in the document D/B 12. When the necessary data is retrieved, the retrieved data can be utilized to edit a new book by registering the retrieved data in the element D/B 22 as previously described with regards to step S117.

Although the above explanation refers to the retrieval of document data, image data or machine sort information may be similarly retrieved. That is to say, if a plurality of retrieval tables of the type illustrated in FIG. 22 are set in the image D/B 13 and in the machine sort information D/B 14, and if ID's of the retrieval tables are input into the items (3-byte length; see FIGS. 6 to 9) in the element data key of the image data and machine sort information, the above-described retrieval operation may be performed.

Although in the preceding description, the machine sort information and image data were registered in respective different D/B's (i.e., machine sort information D/B 14 and image D/B 13), they may be registered in a common D/B since the machine sort information shown in FIGS. 6 to 8 has the same format as that of the image data shown in FIG. 9.

Also when the image and document data were input in the previous embodiment, the temporary key was input first and converted into the element data key in the actual editing operation. However, the temporary key may need not be input first and, instead, the element data key may be input at the beginning, which is similar to the entry of the machine sort information data.

In accordance with the preferred embodiment of the invention having the above-described arrangement, the host computer 1 in FIG. 2 may be a large-scale general purpose computer which enables the materials or elements to be supervised, and the system controller 2 may be a medium-scale relay computer for connecting the host computer 1 and respective editing means 3-1 to 3-N, which enables the data to be supervised in page units or book units so that a new book can be produced by utilizing an original book or elements of the original book previously produced by the editing device. In consequence, new books can be efficiently produced. When, for instance, a service manual, a shop manual, or the like are to be produced by the editing device, if the new manual is to be similar to an original book which has been already produced, the new manual can be produced within an extremely short time and at low cost since a major part of the original book can be utilized for editing the new manual.

The editing device according to this invention may be utilized not only to produce service manuals or shop manuals, but also to produce general books, magazines and newspapers.

In the foregoing description, when the new book was produced by utilizing information in a previously edited book, the layout information read out from the layout D/B 11 was reconstructed into 1-page data in the host computer 1. It is of course possible to perform such a process in the system controller 2. Similarly, under the control of the system controller 2, the 1-page data may be resolved into the information in the element unit and layout information. It should be also noted that when the element data of the machine information was input in the previous description, the element data key was entered at the beginning without entry of the temporary key. However, the temporary key may be first entered, which is similar to the element data relating to document, sentence and image information.

Although the personal computers 4-1 to 4-N were connected to the host computer 1 in the above description, the present invention is not limited to this example;

for instance, they may be connected to the system controller 2. Furthermore, the machine sort information data were input by the personal computers 4-1 to 4-N, in the previous explanation. These personal computers 4-1 to 4-N may be operated as word processors, and used to enter document data into either the host computer 1 or system controller 2.

Figure 26:
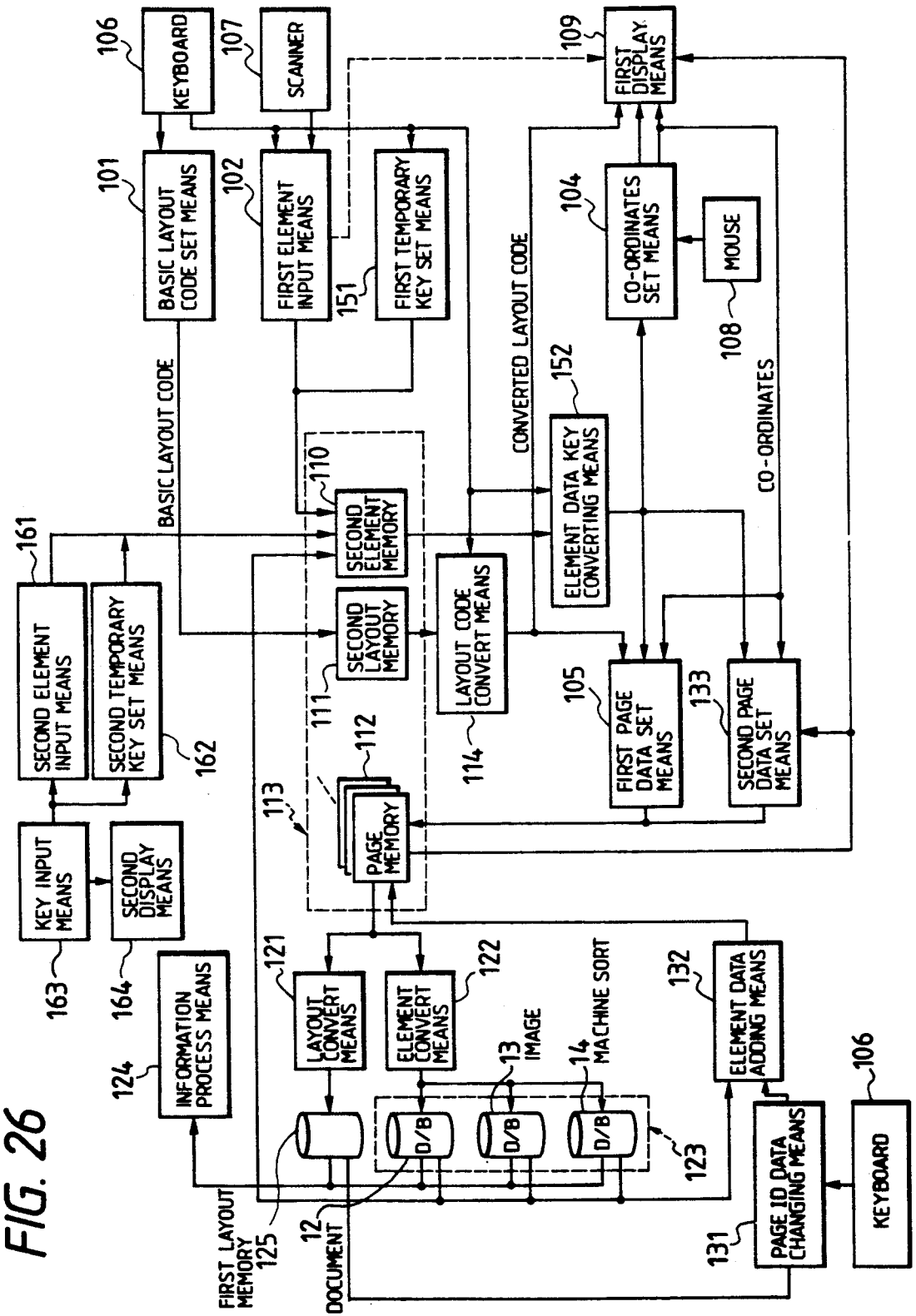
FIG. 26 is a functional block diagram of the first preferred embodiment of the invention.

A concrete construction of the present invention will now be described by reference to FIG. 26, which is a functional block diagram illustrating one preferred embodiment of the present invention. In FIG. 26, the same reference numerals as those in FIG. 2 denote the same or similar parts.

In FIG. 26, keyboard 106 is equivalent functionally to keyboards 5-1 to 5-N illustrated in FIG. 2, key input means 163 is equivalent functionally to the keyboards of personal computers 4-1 to 4-N illustrated in FIG. 2, and scanner 107 has a function similar to that of scanner 8 in FIG. 2. Similarly, first display means 109 is equivalent functionally to CRT's 6 and 10 in FIG. 2, and second display means 164 is equivalent functionally to the CRT's of personal computers 4-1 to 4-N. Also, second element memory means 110 is equivalent functionally to element D/B 22 in FIG. 2, second layout memory means 111 is equivalent functionally to basic layout D/B 23 in FIG. 2, and page memory means 112 is equivalent functionally to book D/B 21 of FIG. 2.

In FIG. 26, keyboard 106 is connected to basic layout code setting means 101, first element inputting means 102, first temporary key setting means 151, layout code converting means 114, and element data key converting means 152. Key input means 163 is connected to second display means 164, second element inputting means 161 and second temporary key setting means 162. The layout code setting means 101 sets the basic layout code (see FIG. 4) entered in the step S1 of FIG. 3A. The first temporary key setting means 151 sets the temporary key shown in FIG. 5.

As previously described with reference to FIG. 5, "D" is input into the head byte of the temporary key which is added to the image data, and "T" is input into the temporary key which is added to the document data. In the editing means 3-1 to 3-N, a determination is made based upon the data of these head bytes whether the data in question is image data or document data, and the respective element data are handled in accordance with the sort of the data in question.

If the temporary key is of 6 bytes as illustrated in FIG. 5, identification data of the element data chosen by an operator is entered as the remaining 5 bytes other than the head bytes. In this case, numerical data is set, for example, in the lower 3 bytes and the numerical data may be automatically carried up after the element data is entered. That is, when the numerical data is set to "001", for example, at the beginning of the entry of the element data, the numerical data may be stepped up to "002", "003", etc., every time element data is entered.

The first element inputting means 102 vector converts the document or sentence data entered by keyboard 106, or the image data and the like input by the scanner 107, and the second element inputting means 161 vector converts document data entered by the key inputting means 163, or the machine sort information data.

The layout code converting means 114 converts the layout code in the basic layout code entered through the basic layout code setting means 101 into the document supervision number and pages.

The element data key converting means 152 converts the temporary key into the element data key shown in FIGS. 15 and 16. Said temporary key is entered through the first or second temporary key setting means 151 or 162, and stored in the second element memory means 110. The element data key converting means 152 may convert the temporary key into the element data key by directly inputting the element data key from the keyboard 106. Otherwise, during the data key conversion, the respective codes constituting the element data key may be displayed on the display device, and these codes may be sequentially selected in a so-called "dialogue" type processing operation with an operator. As to the image information, these codes are the machine sort code, information identification code and so on shown in FIG. 9.

The basic layout code setting means 101 is connected to the second layout memory means 111 in the memory means 113. The second layout memory means 111 is connected to the layout code converting means 114.

The first and second element inputting means 102 and 161 and the first and second temporary key setting means 151 and 162 are connected to the second element memory means 110 in the memory means 113. The second element memory means 110 is connected to the element data key converting means 152.

The element data key converting means 152 is connected to coordinates setting means 104, first page data setting means 105, and second page data setting means 133. The coordinates setting means 104 outputs to the first display means 109, the element data key output from the second element memory means 110 and the element data corresponding to said element data key, and also sets the positional coordinates of the element data moved by operating a mouse 108, and further outputs the coordinates information to the first display means 109, first page data setting means 105 and second page setting means 133.

The layout code converting means 114 calls up an arbitrary basic layout code stored in the second layout memory means 111, converts it into the converted layout code illustrated in the lower portion of FIG. 12, and then provides the converted layout code to the first page data setting means 105 and first display means 109.

The first page data setting means 105 is operated to produce a completely new book, and produces one page data, as illustrated in FIG. 18, by employing the element data key and element data output from the element data key converting means 152, the converted layout code output from the layout code converting means 114, and the coordinates information output from the coordinate setting means 104, and then outputs the one page data to page memory means 112 in the memory means 113.

It should be noted that first element inputting means 102 is connected to first display means 109 by a broken line, which indicates that when a document or the like is entered by keyboard 106, the data of the document or the like is displayed on the first display means 109.

Page memory means 112 is connected to layout converting means 121 and element converting means 122. Layout converting means 121 eliminates LEN and element data from the element data group of the 1-page data (see FIG. 18) stored in the page memory means 112 to produce the layout information illustrated in FIG. 19. Layout converting means 121 are connected to first layout memory means 125 which is further connected to an information processing means 124. First layout memory means 125 corresponds to the layout D/B 11 in FIG. 2.

Element converting means 122 copies the element data group out of the 1-page data stored in page memory means 112, and resolves the copied element data group into some element units. Element converting means 122 are connected to first element memory means 123 which is further connected to information processing means 124. First element memory means 123 comprises the document D/B 12, image D/B 13, and machine sort information D/B 14.

First layout memory means 125 is further connected to a page identification data changing means 131. When a new book is produced by utilizing information from one or more other books which have been previously edited by the editing device and stored in first layout memory means 125 and first element memory means 123, page identification data changing means 131 reads the necessary layout information out of the layout information stored in first layout memory means 125, and rewrites the material supervision number and page number (namely, the page identification data identifying the page of the layout information) of the layout information into the material supervision number and page number of the book to be newly produced. The data entry for said rewriting operation is carried out by the keyboard 106.

Page identification data changing means 131 and first element memory means 123 are connected to an element data adding means 132. Element data adding means 132 reads out of first element memory means 123, the element data of the layout information (see FIG. 19) output from the page identification data changing means 131, which corresponds to the respective element data keys set behind the layout for editing, and then adds said element data to the element data key.

Element data adding means 132 is connected to page memory means 112. Page memory means 112 is furthermore connected to second page setting means 133 and first display means 109.

Second page data setting means 133 is operated to produce a new book which is similar to some book previously edited, and modifies the one page information by employing the 1-page information output from page memory means 112, the data in the element unit output from element data key converting means 152, and the positional coordinates of the element data output from the coordinates setting means 104. Thereafter, the modified 1-page information is output into the page memory means 112. The second page data setting means 133 directly returns 1-page information transferred from the page memory means 112 to the page memory means 112 when no data in the element unit is output from the element data key converting means 152. First element memory means 123 is furthermore connected to second element memory means 110.

The basic layout code setting means 101, first element inputting means 102, first temporary key setting means 151, coordinates setting means 104, first page data setting means 105, second page data setting means 133, layout code converting means 114, and element data key converting means 152 are provided in the editing means 3-1 to 3-N or system controller 2, each shown in FIG. 2. The key inputting means 163, second display means 164, second element inputting means 161, and second temporary key setting means 162 are provided in the personal computers 4-1 to 4-N shown in FIG. 2. The layout converting means 121, element converting means 122, page identification data changing means 131, and element data adding means 132 are provided in the host computer 1 or system controller 2 shown in FIG. 2.

A description will now be given of how a new book is produced in an editing device having the above-described arrangement.

First, information designating the 1-page basic layout is entered by the keyboard 106. This information is arranged into the basic layout code shown in FIG. 4 in the basic layout code setting means 101. This basic layout code is stored in the second layout memory means 111. The entry and storing operation of the basic layout is performed plural times if required.

Then, the temporary key corresponding to the element data to be input is entered. When the element data input subsequent to the element data key are image data such as photographs, illustrations and so on, and a specific inputting means such as the scanner 107 or the like is required to enter these input data, the temporary key is input by the keyboard 106 (such as the keyboard 5-1 connected to the editing means 3-1 shown in FIG. 2). When the element data are characters, symbols, documents and the like which can be input by key operation, the temporary key is entered from the keyboard 106 or key inputting means 163 (any of the personal computers 4-1 to 4-N in FIG. 2).

The data of the temporary key other than the head byte thereof is a code arbitrarily determined by an operator to identify the element data to be input by the operator of the editing means, and does not supervise the element data in the first element memory means 123 or second element memory means 110. The temporary key is set in a form as illustrated in FIG. 5 in the first temporary key setting means 151 or second temporary setting means 162.

If the temporary key is entered by the keyboard 106, then the document or machine sort information is entered by the keyboard 106, the image is read by the scanner 107, and these data are output to the first element inputting means 102. If the temporary key is input by the key inputting means 163, thereafter the document or machine sort information is entered by the key inputting means 163, and these data are output via the second element inputting means 161. In the first or second element inputting means 102 or 161, LEN of the element data is added to the element data, if required. This data is output together with the temporary key to the second element memory means 110 and stored therein. A plurality of entry and storing operations for the temporary key and element data are carried out, if required.

With the above-described operation, editing data such as document and machine sort information comprising characters and symbols are entered by the key inputting means 163.

When the entry of various element data is accomplished, the editing or arranging operation of the element data is commenced by the editing device.

First, the basic layout code, by which the layout data of the page to be edited is set, is read out from the second layout memory means 111 by inputting the layout code from the keyboard 106, and output to the layout code converting means 114. In the layout code converting means 114, the layout code portion of the basic layout code is converted into the material supervision number and page input as shown in the lower code portion of FIG. 12. The converted layout code is output to the first page data setting means 105 and first display means 109, and as illustrated in FIG. 13, the basic layout corresponding to the converted layout code is displayed on the first display means 109.

When an operator inputs the temporary key corresponding to element data to be displayed on the basic layout by means of the keyboard 106, element data having the element data key is output to element data key converting means 152 from the second element memory means 110. In the element data key converting means 152, as previously described, the temporary key is converted to the element data key.

The element data key, and the element data or LEN and the element data output from the element data key converting means 152, are supplied to the first page data setting means 105 and coordinates setting means 104. The coordinates setting means 104 outputs the element data to the first display means 109.

When the element data displayed on the first display means 109 is moved by the mouse 108, the positional coordinates corresponding to the moved position thereof is set by the coordinate setting means 104, and the set coordinates are transferred to the first page data setting means 105. A plurality of element data are displayed at predetermined positions of the basic layout, if required to perform editing of the page.

When the editing of one page has been completed, in response to the output signals from the layout code converting means 114, element data key converting means 152 and coordinates setting means 104, the first page data setting means 105 produce the one page data as illustrated in FIG. 18. The one page data is constructed of the converted layout code output from the layout code converting means 114, layout for editing code consisting of the positional coordinates output from the coordinate setting means 104 and also the element data key of the element data corresponding to the positional coordinates, and the element data group consisting of the element data key which constitutes the layout for editing and the element data corresponding to said element data key.

The 1-page data produced in the first page data setting means 105 is stored in the page memory means 112. The amount of edited 1-page data stored in the page memory means 112 is equal to the pages needed to constitute the book to be edited. These page data are forwarded to a hard copy producing apparatus (not shown).

The 1-page data stored in page memory means 112 is transferred to layout converting means 121 where layout information as represented in FIG. 19 is produced from the 1-page data. The layout information is transferred to the first layout memory means 125 and stored therein.

The 1-page data stored in the page memory means 112 is also transferred to the element converting means 122. In element converting means 122, the element data group is copied from the 1-page data, and the copied element data group is resolved into 1-element units and thereafter transferred to the first element memory means 123. The document (or sentence) element data among the resolved element data group is stored in the document D/B 12 in the first element memory means 123, the image element data is stored in the image D/B 13, and the machine sort information is stored in the machine sort information D/B 14.

A new book can be produced in accordance with the above-described method, and the data of the edited new book is resolved into layout data and element data, and then respectively stored for use in future editing operations. Element data such as document and images stored in the above-mentioned D/B's may also be called up therefrom when it is desired to merely observe said element data for some purpose other than editing. When an element data key which corresponds to the element data to be observed is input by the keyboard 106 or key input means 163, the element data requested is displayed on the first display means 109 if said element data key is input through the keyboard 106, and on the second display means 164 if said element data key is input through the key input means 163.

A description will now be given of how a previously edited book can be used to produce a similar new book.

After an operator determines which pages of a previously edited book are available to edit the new book e.g. by actually observing the previously edited book, the reference supervision number and page (or page identification data) of the previously edited book are entered to read out from the first layout memory means 125 the 1-page data which is available for the new book. The readout data is transferred to the page identification data changing mean 131.

When the reference supervision number and page of the new book to be produced are entered by the keyboard 106 or other key inputting means 163 (not shown) connected to the page identification data changing means 131, the reference supervision number and page of the readout data are changed into the entered reference supervision number and page in the page identification data changing means 131.

The element data adding means 132 reads out from the first element memory means 123, the element data of the changed 1-page data which corresponds to the element data key set after the layout for editing, and adds said element data to the end of the element data key. With this operation, one page data can be established.

After the complete 1-page data is stored in the page memory means 112, it is transferred to the first display means 109 and displayed, and also transferred to the second page data setting means 133. An operator judges whether or not the one page data must be changed while observing the display of said one page data on the first display means 109. If a judgement is negative, the resultant information is output from suitable means (not shown), the one page data is transferred to the page memory means 112, and furthermore said data is resolved into element data and layout data in the layout converting means 121 and element converting means 122. In this case, since the element data has been already stored in the first element memory means 123, only the layout data is output to the first layout memory means 125 to be stored in it.

When some particular element data among the 1-page data displayed on the first display means 109 is to be deleted or changed into other element data, or when the 1-page data displayed on the first display means 109 should be edited, the element data key corresponding to said particular element data is entered, so that the element information, i.e., the element data key and element data are read out from the first element memory means 123 and registered into the second element memory means 110. This readout operation may be performed by either the keyboard 106 or key inputting means 163.

If the necessary element data is not stored in the first element memory means 123, the temporary key and element data are newly entered to be registered in the second element memory means 110. That is to say, the second element memory means 110 stores the element information consisting of the temporary key and element data, and the element information consisting of the element data key and element data. The second element memory means 110 is energized by appropriate means (not shown) and outputs the necessary element data and element data key, or the element data and temporary key to the element data key converting means 152. When the element data and temporary key are called up, the element data key converting means 152 converts the temporary key into the element data key entered by the keyboard 106, and outputs them. On the other hand, when the element data and element data key are called up, the element data key converting means 152 outputs the element data key without any conversion.

The element data key and element data output from the element data key converting means 152 are transferred to the coordinates setting means 104 and second page data setting means 133. The coordinates setting means 104 outputs the element data to the first display means 109, and sets the positional coordinates of the element data which are determined by the mouse 108 to supply them to the second page data setting means 133.

After the changes (or editing) of the 1-page data displayed on the first display means 109 have been accomplished by repeating the above mentioned operation if required, the second page data setting means 133 rearranges the 1-page data transferred from the page memory means 112 as the edited 1-page data. More particularly, the second page data setting means 133 erases the element data, the element data key and the positional coordinates thereof among the 1-page data transferred from the page memory means 112 and overlaps said element data by the element data newly set on the layout during editing. The element data key corresponds to the element data. Also, the second page data setting means 133 adds the element data newly set on the layout during editing, the element data key corresponding to said element data and the positional coordinates of said element data.

Thus, the edited or changed 1-page data is output from the second page data setting means 133 to the page memory means 112 to be stored therein. Then, the 1-page data is output to the layout converting means 121 and element converting means 122 in the page unit or book unit. The layout converting means 121 and element converting means 122 resolve the output data into the element and layout data, and output the resolved data to the respective first layout memory means 125 and first element memory means 123 to be stored therein. Any data which have been previously stored in the first element memory means 123 are not doubly stored therein.

Using the above-described operations, when a new book is to be produced that resembles a previously edited book, common element data can be used without any modification, thereby greatly shortening the time required to produce the new book.

Figure 31:
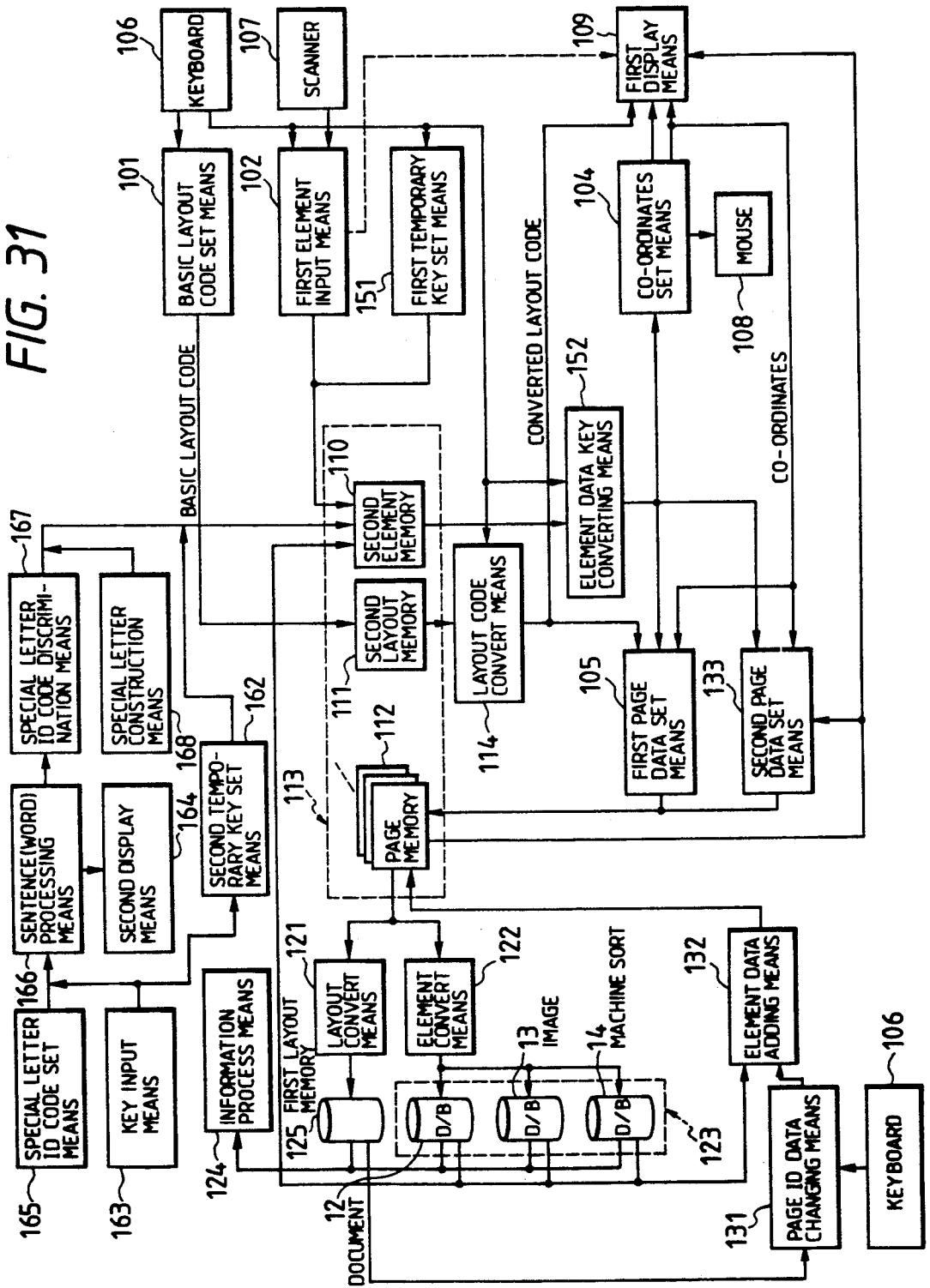
FIG. 31 is a functional block diagram of the fourth preferred embodiment of the present invention.
Figure 32:
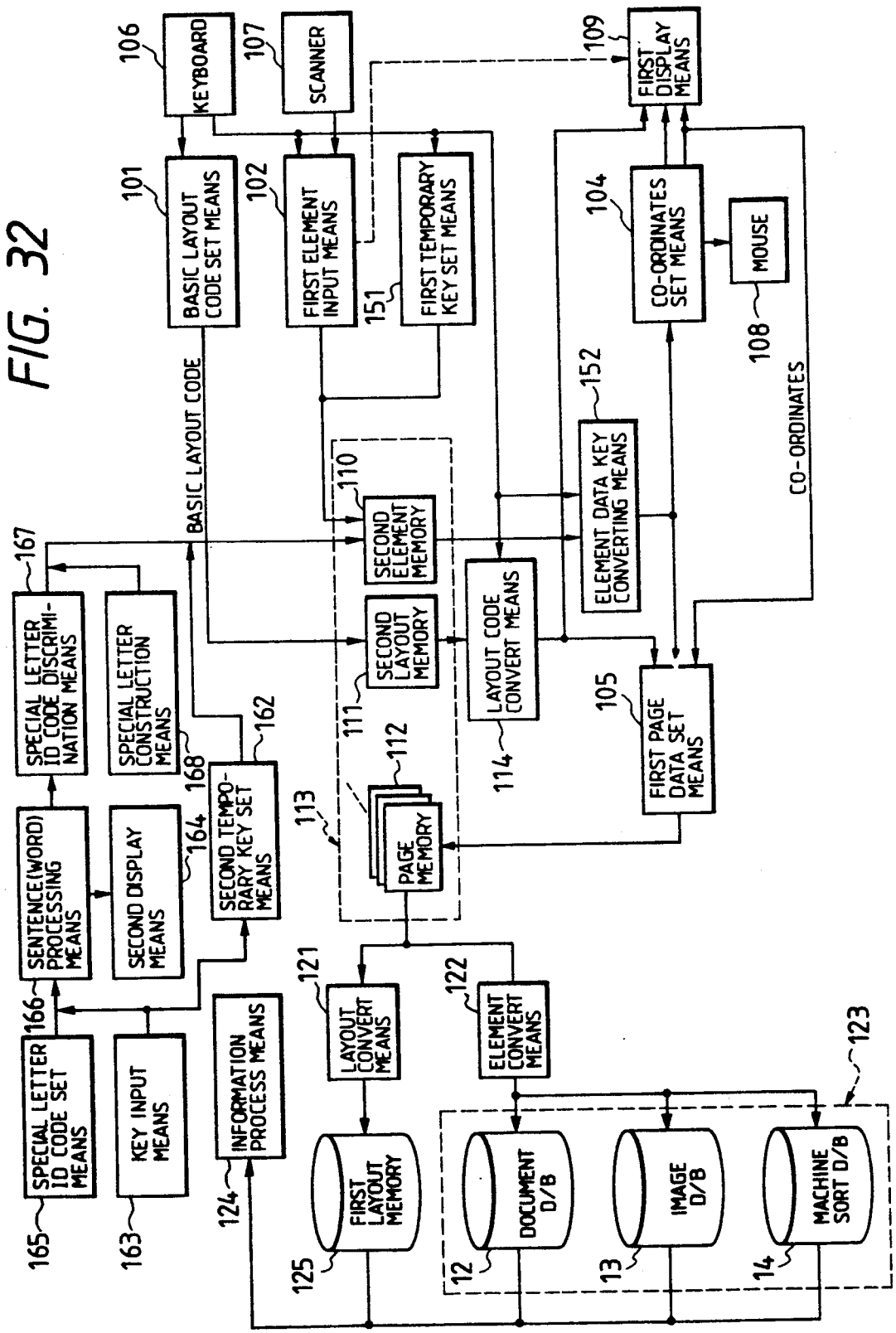
FIG. 32 is a functional block diagram of the fifth preferred embodiment of the present invention.
Figure 33:
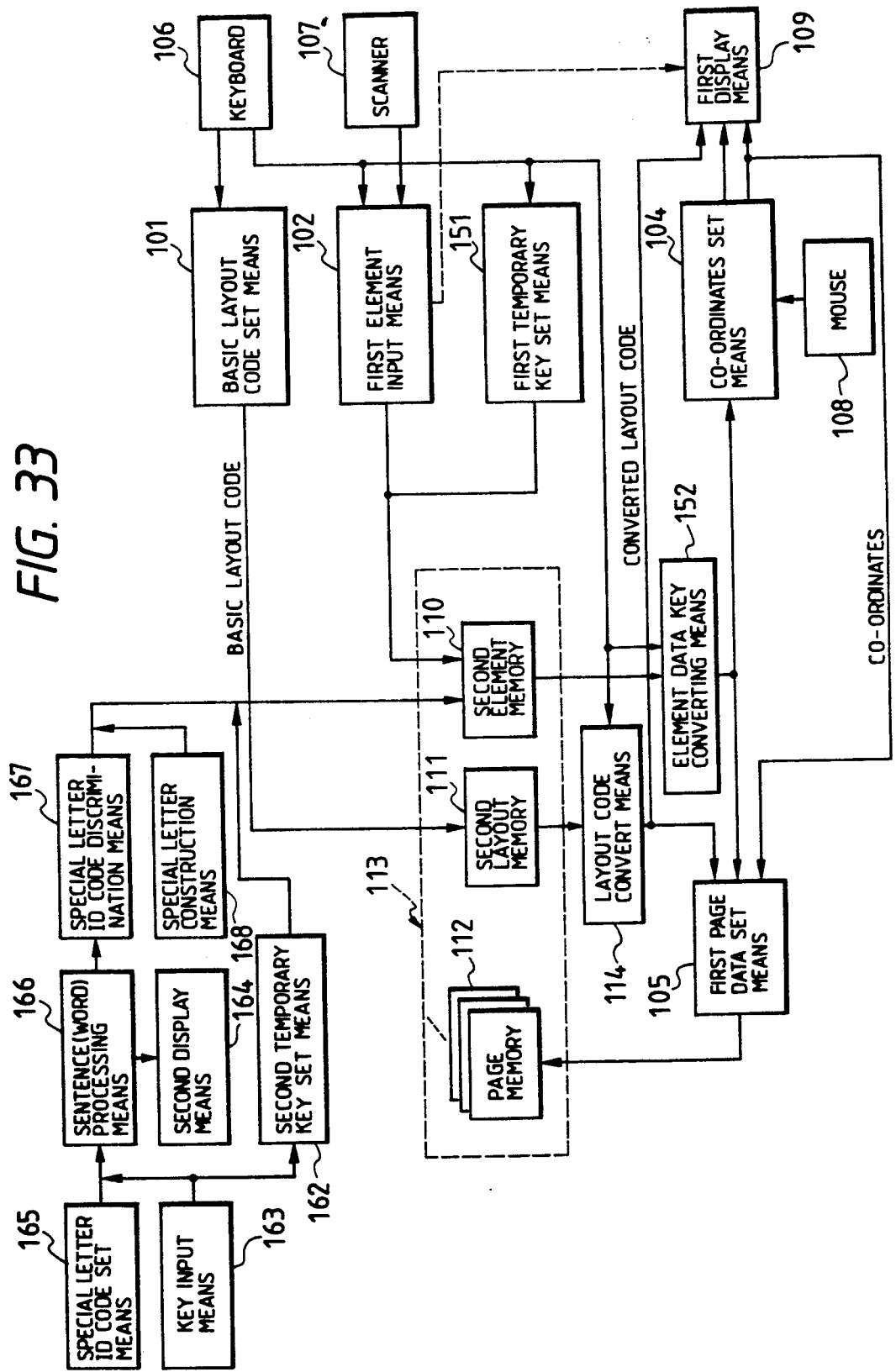
FIG. 33 is a functional block diagram of the sixth preferred embodiment of the present invention; and, FIG. 34 is a functional block diagram of the seventh preferred embodiment of the present invention.
Figure 34:
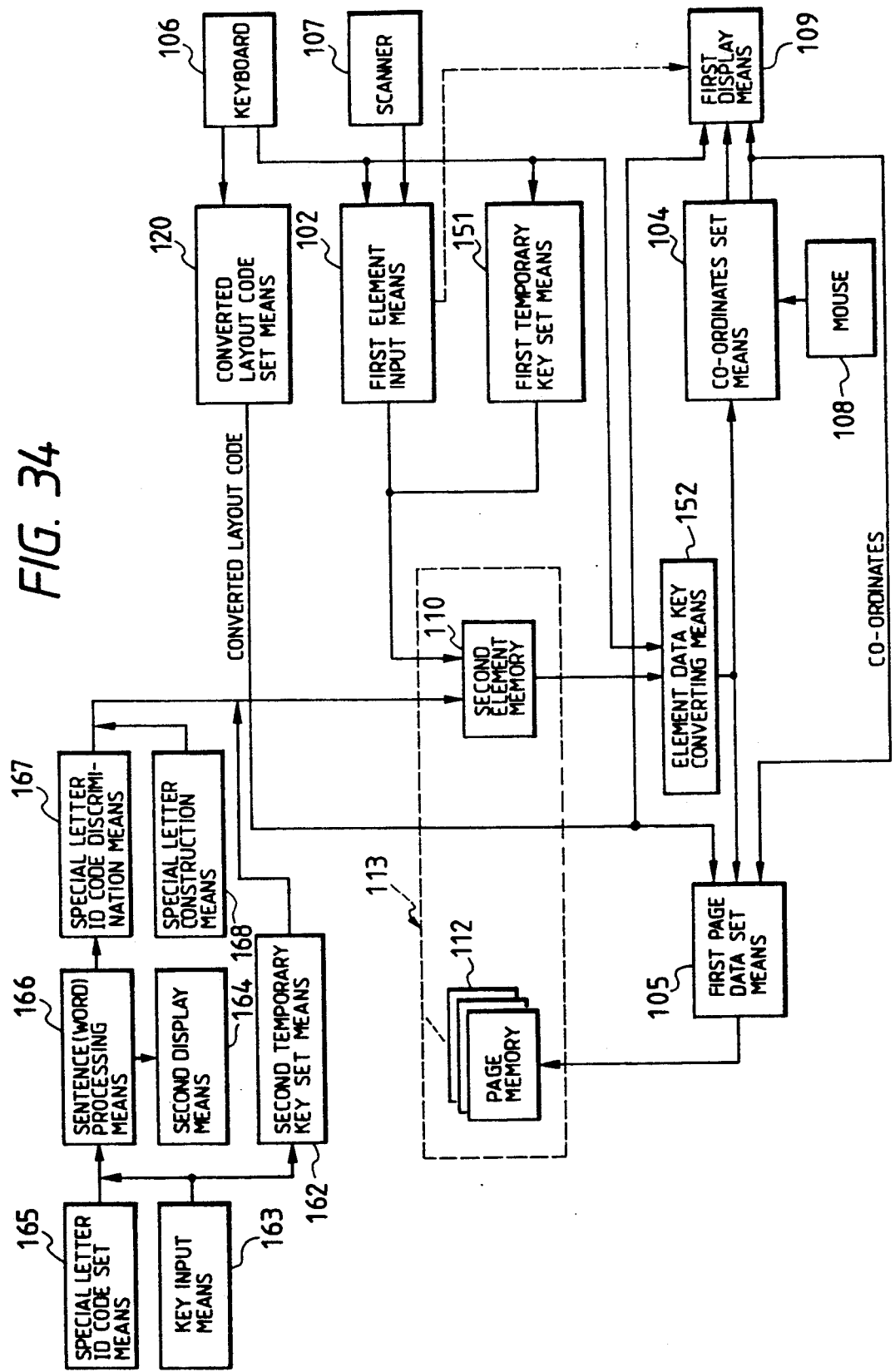

FIG. 31 is a block diagram of another preferred embodiment of the invention. The reference numerals in FIG. 31 which are the same as those in FIG. 26 denote the same or similar circuit elements.

In FIG. 31, a special letter identification code setting means 165 outputs a specific character identification code when a symbol entered by the key inputting means 163 corresponds to a specific character or letter which cannot be entered directly by the keyboard. A document producing (or processing) means 166 produces a document by employing the data entered by the key inputting means 163, and the code output from the special letter identification code setting means 165, and outputs the resultant document data. The document producing means 166 is provided with the second element inputting means 161 shown in FIG. 26 and means for editing (moving, copying or the like) the input document. In other words, the personal computers 4-1 to 4-N (in the embodiment of FIG. 31) function as word processors.

A special letter identification code discrimination means 167 judges whether or not the document data output from the document producing means 166 contains a special letter identification code. If yes, then the judging means 167 transfers a symbol output subsequent to the special letter identification code and a character or letter output subsequent to the symbol to a special letter construction means 168. If the judgment is negative, the symbol or character of the document data is directly output to a second element memory means 110.

The special letter construction means 168 produces a predetermined specific character or letter code based on the symbol and character output subsequent to said symbol which are derived from the special letter identification code discrimination means 167, and outputs the specific character code to the second element memory means 110.

The second temporary key setting means 162, key inputting means 163, second display means 164, special letter identification code setting means 165, and document producing means 166 are equipped within the personal computers 4-1 to 4-N shown in FIG. 2. The special letter identification code discrimination means 167 and special letter construction means 168 are provided within the personal computers 4-1 to 4-N, host computer 1, or system controller 2 shown in FIG. 2.

A description will now be given of how documents or sentences, for instance in French, are produced by the work stations (that is, personal computers 4-1 to 4-N) in an editing apparatus having the above-described construction according to this invention.

In general, the work stations connected to the host computer function as word processors. An operator produces a document by using the word processor function. However, as in ordinary word processors, these work stations can only enter certain alphabets, numerals and basic symbols. If an effort is made to enter the French character "é", this character cannot be directly entered through an ordinary keyboard because no key for that French character is provided in the keyboard.

According to the editing apparatus of this invention, a specific character identification code is first output from the code setting means 165 instead of the entry of the specific character "é", and thereafter a symbol indicative of "/" and an alphabet "e" are continuously entered from the key inputting means 163.

When, for instance, the French word "température" is entered by the key inputting means 163, an operator first enters the characters "temp" by the keyboard connected to the key inputting means 163. However, the specific character "é" to be input subsequently cannot be directly entered from the keyboard without modifying this character. Accordingly, the special letter identification code is output by code setting means 165, thereafter both the symbol "/" and the character "e" are continuously input by the key inputting means, and then the remaining characters "rature" are entered, so that the entry of said French word is accomplished.

In the document producing means 166, the document is produced based on the special letter identification code entered by the special letter identification code setting means 165 and by the symbol as well as characters input by the key inputting means 163, and the document so produced is output to the second display means 164. At the same time, this document is output as document data to the special letter identification code discrimination means 167. In this case, the data format of the above-described French word "température" output from the document producing means 166 is "temp#/erature". It should be noted that "#" represents the special letter identification code. Even if the special letter identification code is input, this code itself is not displayed on the second display means 164; instead the symbol and characters entered subsequent to special letter identification code are displayed in different colors, or with different brightness. Accordingly, they can be discriminated from the remaining characters.

In the special letter identification code discrimination means 167, a judgement is made whether or not the document data output from the document producing means 166 contains the special letter identification code, namely "#". If not, then this document data is directly output to the second element memory means 110 without any modification.

When the special letter identification code is present in the output document data, the symbol entered subsequent to the special letter identification code and the characters input subsequent to the symbol are supplied to the special letter construction means 168. In this example, both the symbol "/" and character "e" are output to the special letter construction means 168 which then generates the predetermined specific character "é" composed of the symbol "/" and the letter "e", and outputs it to the second element memory means 110.

As apparent from the foregoing description, in the embodiment of FIG. 31 specific characters which cannot be entered by simply operating a conventional work station as a word processor, but which may be entered only by way of a small-scale computer, can be input even by the work station. As a result, there is no need to employ a large quantity of expensive small-scale computers requiring complex operations, and editing work can instead be efficiently performed by conventional work stations.

Figure 27:
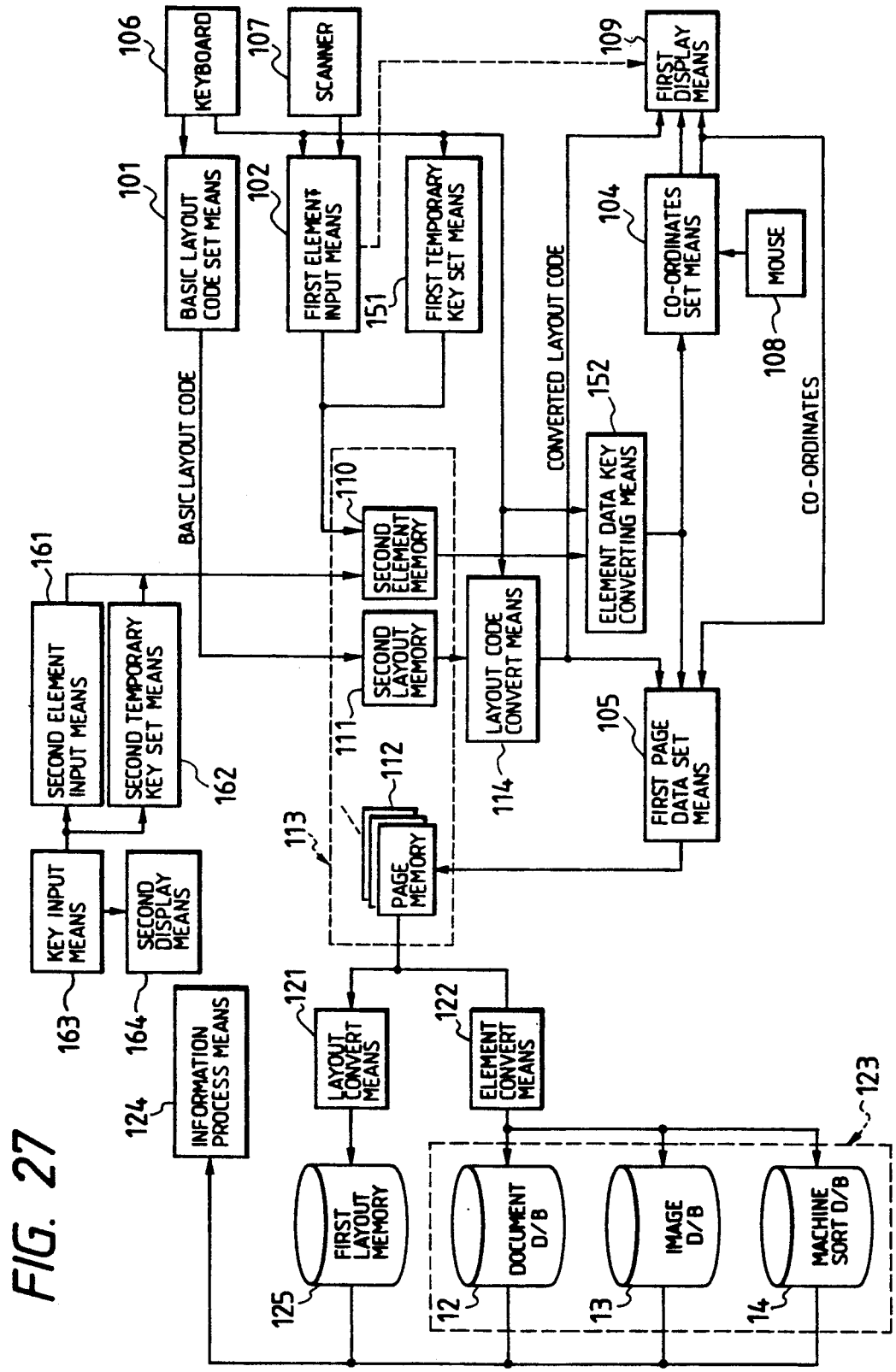
FIG. 27 is a functional block diagram of another preferred embodiment of the invention.

FIG. 27 is a block diagram of a still further preferred embodiment of this invention. The reference numerals in FIG. 27, that are the same as those in FIG. 26 denote the same or similar circuit components.

As is apparent from a comparison of FIGS. 26 and 27, the page identification data changing means 131, element data adding means 132 and second page data setting means 133 shown in FIG. 26 have been omitted in the preferred embodiment of FIG. 27. In the FIG. 27 embodiment, although a new book cannot be produced by employing the layout data and element data of a previously edited book, the new book can be edited by using the element data unless the element data used for editing the previously edited book is erased from the second element memory means 110. As is similar to the preferred embodiment of FIG. 26, the element data of the produced book can be utilized in the information processing means 124 for performing processes other than editing.

Figure 28:
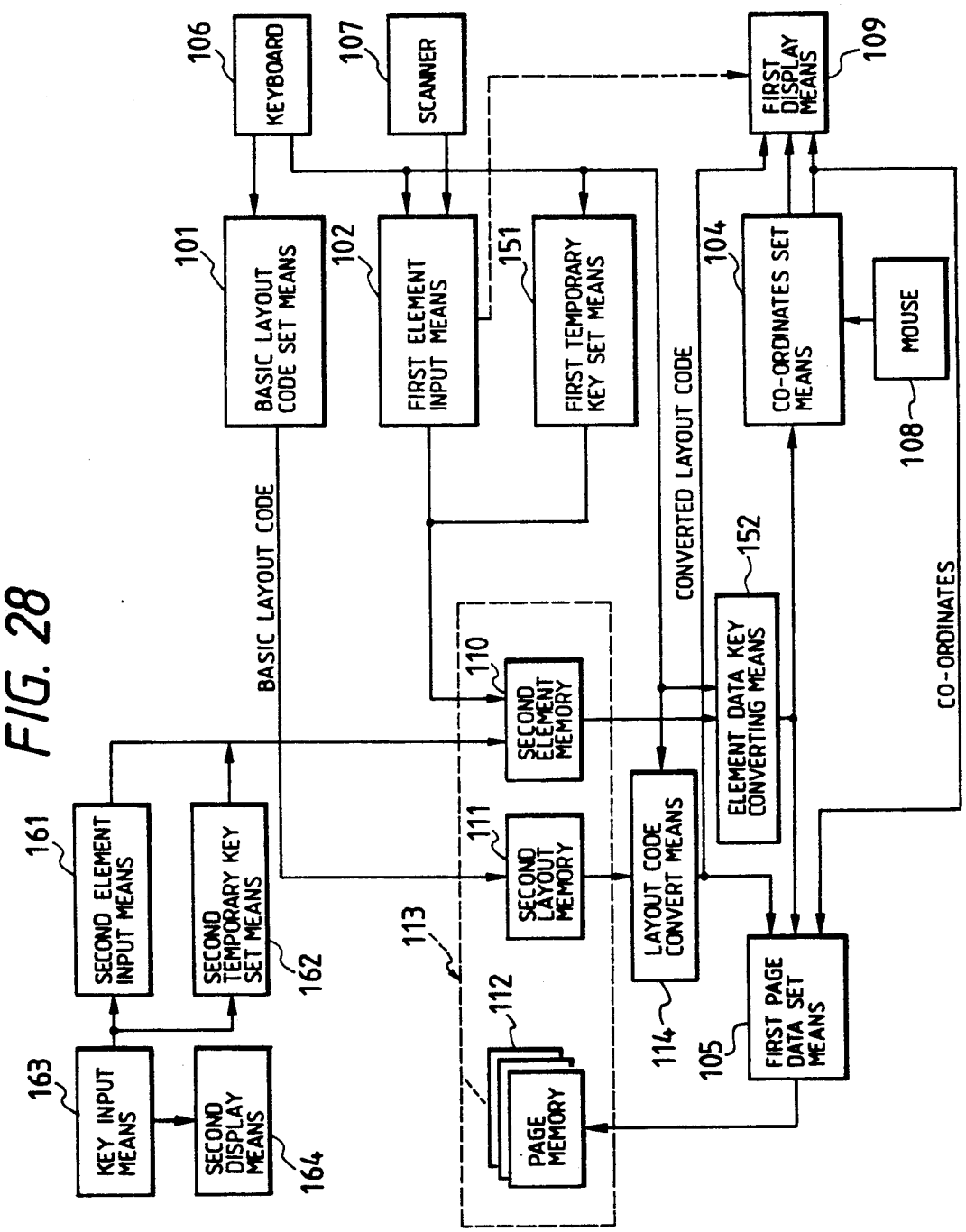
FIG. 28 is a functional block diagram of a further preferred embodiment of the invention.

FIG. 28 is a functional block diagram of another embodiment of the invention. The reference numerals in FIG. 28 that are the same as those in FIG. 27 denote the same or similar circuit components. As is obvious from a comparison of FIGS. 27 and 28, the layout converting means 121, element converting means 122, first element memory means 123 and first layout memory means 125 have been omitted in the embodiment of FIG. 28. As a result, data of a previously edited book cannot be stored after being resolved into the element information and layout information, and element information cannot be utilized in information processing means other than the editing apparatus (the information processing means 124 shown in FIG. 27). However, unless the data relating to the edited element is erased in the second element memory means 110, common element data can be commonly utilized when a book similar to a previously edited book is to be produced, in a manner similar to the editing apparatus shown in FIG. 27.

Figure 29:
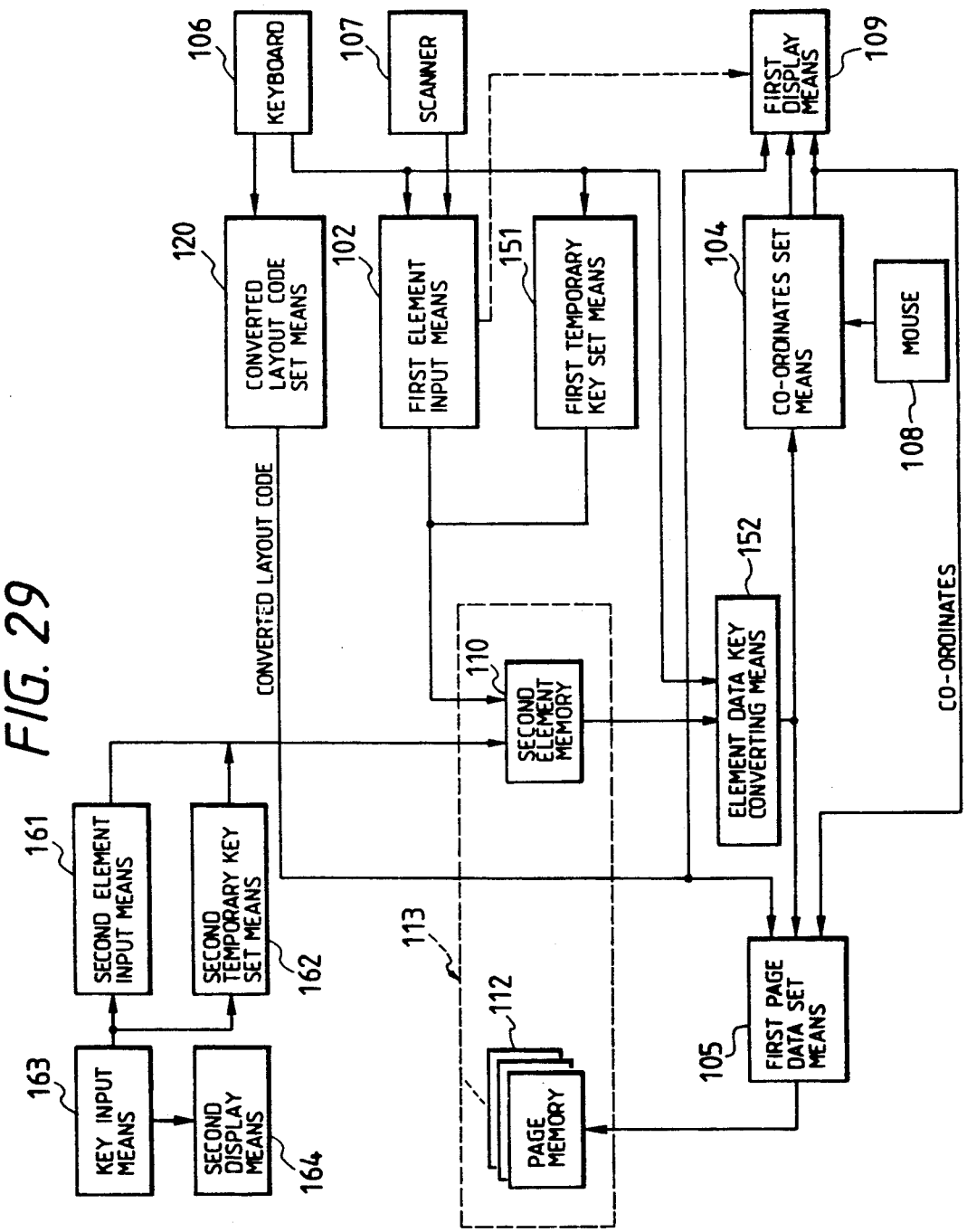
FIG. 29 is a functional block diagram of a still further preferred embodiment of the invention.
Figure 30:
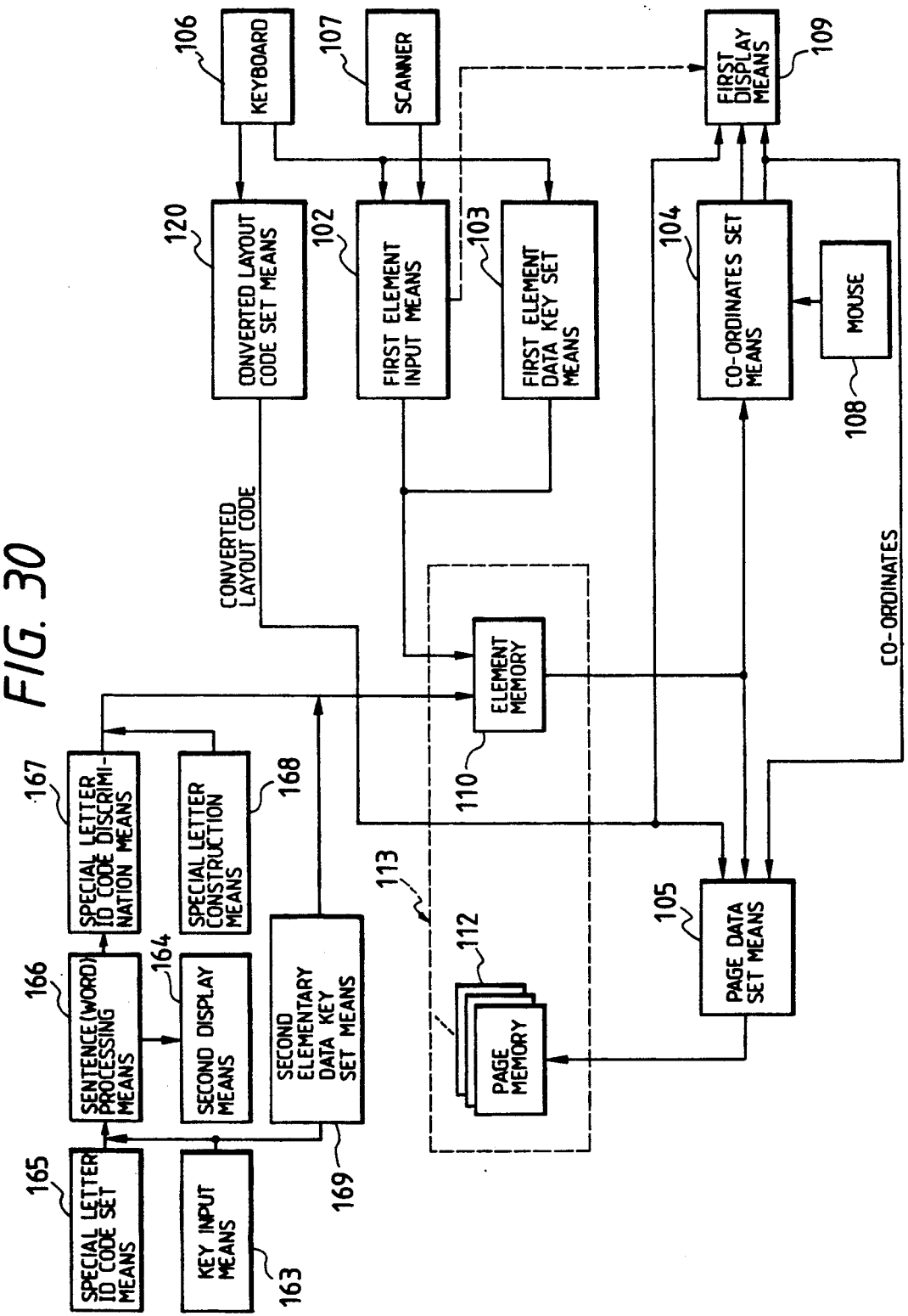
FIG. 30 is a functional block diagram illustrating a basic construction of the fourth preferred embodiment of the present invention.

FIG. 29 is a functional block diagram of modification of the embodiment shown in FIG. 28. In FIG. 29, the converted layout code setting means 120 connected to keyboard 106 directly sets the converted layout code. Since the layout code should be set every time each page is edited, this embodiment is preferably not used to edit a book having a large number of pages. However, it has the advantage of being a simpler circuit arrangement than the preferred embodiments shown in FIGS. 26, 27 and 28.

FIG. 1 is a functional block diagram of a modification of the embodiment shown in FIG. 29. The reference numerals in FIG. 1 which are the same as those in FIG. 29 denote the same or similar circuit elements. In the FIG. 1 embodiment, since the element data key must be set every time the element data is entered, it is preferable that this embodiment not be used to edit a book requiring numerous element data. However, the FIG. 1 embodiment is much simpler in construction than the embodiments shown in FIGS. 26, 27, 28 and 29.

FIGS. 30, 32, 33 and 34 are functional block diagrams of still further preferred embodiments according to this invention in which, respectively, the specific character or letter can be entered, and the second element inputting means 161 shown in FIGS. 1, 27, 28 and 29 have been replaced by the special letter identification code setting means 165, document producing means 166, special letter identification code discrimination means 167 and special letter construction means 168.

As is apparent from the foregoing descriptions, the present invention makes is possible for simple editing data (machine sort information) consisting of numbers and symbols as well as document data to be produced by work stations (personal computers, word processors etc.) and to be directly entered without any modifications. In consequence, a small-scale computer needs to be utilized only when the entry of complex data such as images of photographs and illustrations requires specific input devices, or when editing utilizing said complex image data is performed, and there is no need to provide a large number of such small-scale computers. As a result the editing device can be manufactured at low cost.

Moreover, the entry of simple data such as document and machine sort information which is effected only by a keyboard operation, can be performed by simple work stations without employing complex small-scale computers. As a result, time required to enter the data can be shortened and more efficient editing can be achieved.

In addition, according to this invention, a document written in specific characters other than usual alphabets, e.g., a French or German document, can be readily handled, so that the wider application of word processors can be effected.

We claim:

1. An editing device comprising a host computer to which a data base is connected, editing means connected to the host computer, and a personal computer connected to one of said host computer and said editing means, said editing means comprising first input means for inputting element data, and first setting means for setting an element data key corresponding to the element data input by said first input means, said personal computer including second input means for inputting element data constituting a page, and second setting means for setting an element data key corresponding to the element data input by said second input means; and, said editing means further including means for setting a converted layout code by which a basic layout of a page to be edited is designated; means for setting positional coordinates of each of said element data on the basic layout; and means for setting one page data by employing said converted layout code, element data used for an editing operation, the element data keys corresponding to said element data, and the positional coordinates of said element data.

2. An editing device as claimed in claim 1 wherein the means for setting a converted layout code includes:

means for setting a basic layout code having a layout data portion and a layout code portion;

memory means for storing and selectively reading out said basic layout code; and, means for converting and layout code portion of said basic layout code, read out of said memory means during an editing operation, into a reference supervision number of a book to be edited and a page number to be edited, and for thereafter setting said converted layout code.

3. An editing device as claimed in claim 2, comprising further memory means for temporarily storing said element data and element data keys.

4. An editing device as claimed in claim 3, wherein at least one of the first and second setting means comprises means for setting a temporary key corresponding to the element data, and means for converting the temporary key into the element data key, the element data input by at least one of the first and second input means and said temporary key being temporarily stored in said further memory means.

5. An editing device comprising a host computer to which a data base is connected, editing means connected to the host computer, and a personal computer connected to one of said host computer and said editing means, said editing means comprising first input means for inputting element data, and means for setting a first element data key corresponding to the element data input by said first input means, said personal computer comprising second input means for inputting further element data constituting a page, means for setting a specific character identification code by which a given character in the element data is designated as a specific character, means for identifying the specific character identification code contained in the element data, means for converting element data input subsequent to the specific character identification code into a predetermined specific character, and means for setting a second element data key corresponding to the further element data; and, the host computer and editing means comprising means for setting a converted layout code by which a basic layout of a page to be edited is designated, means for setting positional coordinates of each element data on the basic layout, and means for setting one page data by employing the converted layout code, element data used for the editing operation, the element data keys, and the positional coordinates of said element data.

6. An editing device as claimed in claim 5 wherein the means for setting a converted layout code includes:

means for setting a basic layout code having a layout data portion and a layout code portion;

memory means for storing and selectively reading out said basic layout code; and, means for converting the la; out code portion of the basic layout code, read out of said memory means during an editing operation, into a reference supervision number of a book to be edited and a page number to be edited, and for thereafter setting said converted layout code.

7. An editing device as claimed in claim 6, comprising further memory means for temporarily storing said element data and element data keys.

8. An editing device as claimed in claim 7, wherein said means for setting element data keys comprises means for setting a temporary key corresponding to the element data, and means for converting the temporary key into the element data key, and the element data input by at least one of the first and second input means, and said temporary key, are temporarily stored in said further memory means.

* * * * *